United States Patent
Keister et al.

(10) Patent No.: US 11,919,416 B2
(45) Date of Patent: *Mar. 5, 2024

(54) SYSTEMS, APPARATUS AND METHODS FOR ELECTRIC VEHICLE CHARGING VIA A POWER CONVERSION SYSTEM

(71) Applicant: Resilient Power Systems, Inc., Athens, GA (US)

(72) Inventors: Josh Keister, Atlanta, GA (US); Lyle T. Keister, Athens, GA (US); Mehdi Abolhassani, Houston, TX (US)

(73) Assignee: Resilient Power Systems, Inc., Athens, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/825,001

(22) Filed: May 26, 2022

(65) Prior Publication Data
US 2022/0348101 A1 Nov. 3, 2022

Related U.S. Application Data

(60) Division of application No. 17/676,491, filed on Feb. 21, 2022, now Pat. No. 11,648,844, which is a
(Continued)

(51) Int. Cl.
*B60L 53/62* (2019.01)
*B60L 58/12* (2019.01)
(Continued)

(52) U.S. Cl.
CPC .............. *B60L 53/62* (2019.02); *B60L 58/12* (2019.02); *H02J 7/0013* (2013.01);
(Continued)

(58) Field of Classification Search
CPC ...... B60L 53/62; B60L 58/12; B60L 2210/10; H02J 7/0013; H02J 7/0048
(Continued)

(56) References Cited

U.S. PATENT DOCUMENTS

| | | | |
|---|---|---|---|
| 5,642,270 A | | 6/1997 | Green et al. |
| 5,926,004 A | * | 7/1999 | Henze ................ H02J 50/12 |
| | | | 320/109 |

(Continued)

FOREIGN PATENT DOCUMENTS

| | | |
|---|---|---|
| EP | 2815913 A1 | 12/2014 |
| WO | 2018158453 A1 | 9/2018 |
| WO | 20200244731 A1 | 12/2020 |

OTHER PUBLICATIONS

United States Patent Office, Final Office Action dated Sep. 28, 2022 in U.S. Appl. No. 17/676,491 (12 pages).

(Continued)

*Primary Examiner* — Richard V Muralidar

(74) *Attorney, Agent, or Firm* — Trop, Pruner & Hu, P.C.

(57) ABSTRACT

In one embodiment, an EV charging system includes: a plurality of first converters to receive and convert grid power at a distribution grid voltage to at least one second voltage; a high frequency transformer coupled to the first converters to receive the at least one second voltage and output at least one high frequency AC voltage; and a plurality of port rectifiers coupled to a plurality of secondary windings of the high frequency transformer, each of the port rectifiers comprising a unidirectional AC-DC converter to receive and convert the at least one high frequency AC voltage to a DC voltage. At least some of the port rectifiers may be coupled in series to provide at least one of a charging current or a charging voltage to at least one dispenser to which at least one EV is to couple.

20 Claims, 23 Drawing Sheets

Related U.S. Application Data continuation-in-part of application No. 17/244,993, filed on Apr. 30, 2021, now Pat. No. 11,292,352.

(51) Int. Cl.
| | |
|---|---|
| *H02J 7/00* | (2006.01) |
| *H02J 7/04* | (2006.01) |
| *H02M 3/335* | (2006.01) |
| *H02J 3/38* | (2006.01) |
| *H02J 7/35* | (2006.01) |

(52) U.S. Cl.
CPC .......... *H02J 7/0029* (2013.01); *H02J 7/0048* (2020.01); *H02J 7/00712* (2020.01); *H02J 7/007194* (2020.01); *H02J 7/04* (2013.01); *H02M 3/33573* (2021.05); *H02M 3/33584* (2013.01); *B60L 2210/10* (2013.01); *B60L 2210/30* (2013.01); *H02J 3/381* (2013.01); *H02J 7/35* (2013.01); *H02J 2207/20* (2020.01); *H02J 2300/24* (2020.01)

(58) Field of Classification Search
USPC ............. 320/109; 307/5, 6, 7, 45, 46, 58, 82
See application file for complete search history.

(56) References Cited

U.S. PATENT DOCUMENTS

| | | | |
|---|---|---|---|
| 6,664,762 B2* | 12/2003 | Kutkut | H02M 3/33561 320/116 |
| 7,256,516 B2 | 8/2007 | Buchanan et al. | |
| 8,824,179 B2* | 9/2014 | Limpaecher | H02M 3/33584 363/71 |
| 9,780,682 B2 | 10/2017 | Keister et al. | |
| 9,906,155 B2 | 2/2018 | Keister et al. | |
| 10,131,239 B2 | 11/2018 | Herke et al. | |
| 10,608,545 B2 | 3/2020 | Keister et al. | |
| 10,696,183 B2* | 6/2020 | Roggendorf | H01F 30/04 |
| 10,811,988 B2 | 10/2020 | Keister et al. | |
| 11,292,352 B1* | 4/2022 | Keister | B60L 55/00 |
| 2003/0038612 A1 | 2/2003 | Kutkut | |
| 2011/0273917 A1 | 11/2011 | Maitra et al. | |
| 2018/0339601 A1 | 11/2018 | Kruszelnicki | |
| 2020/0313443 A1 | 10/2020 | ElMenshawy et al. | |
| 2022/0161677 A1* | 5/2022 | Pizzurro | H02J 3/381 |

OTHER PUBLICATIONS

Chargepoint, Inc., CT 4000 Family, ChargePoint Level 2 Commercial Charging Stations, 2021, pp. 1-4.

Tesla; Supercharging Tesla, 2021, pp. 1-7.

U.S. Appl. No. 17/244,993, filed Apr. 30, 2021, entitled "Systems, Apparatus and Methods for Electric Vehicle Charging via a Power Conversion System," by Josh Keister et al.

U.S. Appl. No. 17/676,491, filed Feb. 21, 2022, entitled "Systems, Apparatus and Methods for Electric Vehicle Charging via a Power Conversion System," by Josh Keister et al.

United States Patent Office, Office Action dated Jun. 9, 2022 in U.S. Appl. No. 17/676,491 (18 pages).

United States Patent Office, Notice of Allowance dated Jan. 11, 2023 in U.S. Appl. No. 17/676,491 (11 pages).

International Search Authority, International Search Report and Written Opinion dated Aug. 18, 2022 in International Application No. PCT/US2022/021699 (18 pages).

\* cited by examiner

SYSTEMS, APPARATUS AND METHODS FOR ELECTRIC VEHICLE CHARGING VIA A POWER CONVERSION SYSTEM

CROSS-REFERENCE TO RELATED APPLICATION

The present application is a divisional of U.S. patent application Ser. No. 17/676,491, filed on Feb. 21, 2022, which is a continuation-in-part of U.S. patent application Ser. No. 17/244,993, filed on Apr. 30, 2021, now U.S. Pat. No. 11,292,352, issued Apr. 5, 2022, the content of which is hereby incorporated by reference.

BACKGROUND

Power conversion systems are used to interface a variety of different electrical loads with a power system and any associated energy storage. Power conversion systems with transformers provide galvanic isolation and allow loads to be decoupled from distribution systems and to operate at different voltages and frequencies. However, space and energy is limited in many conversion systems.

One power conversion system of current interest is a charger that can be used to charge an electric vehicle (EV). As EVs become more prevalent and are provisioned with varying charge capabilities, there is much interest in EV charging systems. Currently, such charging systems are rather bulky and expensive, and can be somewhat inflexible in charge capabilities. For wide adoption of electric vehicles, higher power fast charging stations are needed.

SUMMARY OF INVENTION

In one aspect, an electric vehicle (EV) charging system includes: a plurality of first converters to receive grid power at a distribution grid voltage and convert the distribution grid voltage to at least one second voltage; at least one high frequency transformer coupled to the plurality of first converters to receive the at least one second voltage and to electrically isolate a plurality of second converters coupled to an output of the at least one high frequency transformer; and the plurality of second converters coupled to the output of the at least one high frequency transformer to receive the at least one second voltage and convert the at least one second voltage to a third DC voltage. At least some of the plurality of second converters are to couple to one or more EV charging dispensers to provide the third DC voltage as a charging voltage or a charging current.

In an example, the plurality of first converters are to receive the distribution grid voltage directly from a distribution grid network without an intervening power transformer. In one case, at least two of the plurality of second converters are to provide the charging voltage to a first EV charging dispenser. The at least two of the plurality of second converters can be connected in series. The at least one high frequency transformer may have a single primary winding and a plurality of secondary windings, where each of the plurality of secondary windings is to provide the at least one second voltage to one of the plurality of second converters.

In an example, the EV charging system further comprises a grid-tie module having the plurality of first converters, the grid-tie module directly coupled to a distribution grid network to receive the distribution grid voltage. The EV charging system may further comprise at least one solar converter coupled to the at least one high frequency transformer and at least one photovoltaic array.

In an example, the EV charging system further includes a controller, in a generation mode, to cause energy from the at least one photovoltaic array to be provided to the distribution grid network via the EV charging system. The controller, in a charging mode, may cause at least some of the energy from the at least one photovoltaic array to be provided to the one or more EV charging dispensers. The controller, in a reverse power mode, is to cause stored energy from an energy storage of an EV coupled to the one or more EV charging dispensers to be provided to the distribution grid network.

In an example, the at least one high frequency transformer is to operate at 5 kilohertz or more. At least one of the plurality of second converters may receive a low voltage from a power generator coupled to the EV charging system, the power generator to generate the low voltage from an ammonia-based source. At least one other of the plurality of second converters may receive the low voltage from the at least one high frequency transformer and provide the third DC voltage to the one or more EV dispensers using the low voltage.

In an example, the EV charging system further includes a controller to obtain power telemetry information from a distribution grid network that provides the grid power, and based at least in part thereon, to cause the EV charging system to compensate the distribution grid network for at least one of reactive power, harmonic current, or voltage sag. The EV charging system may integrate the one or more EV charging dispensers to enable one or more EVs to directly couple to the EV charging system.

In another aspect, an EV charging system comprises: a grid-tie module to directly couple to a distribution grid network at a grid connection and convert a grid voltage to a plurality of high frequency AC voltages; at least one high frequency transformer coupled to the grid-tie module to receive the plurality of high frequency AC voltages and to output a plurality of electrically isolated high frequency AC voltages; and a plurality of EV chargers coupled to the at least one high frequency transformer. Each of the plurality of EV chargers may receive one of the plurality of electrically isolated high frequency AC voltages and provide a DC voltage to at least one EV charging dispenser.

In an example, each of the plurality of EV chargers comprises at least one output stage comprising: an AC-DC converter coupled to the at least one high frequency transformer to receive one of the plurality of electrically isolated high frequency AC voltages and output a first DC voltage; and a DC-DC converter coupled to the AC-DC converter to receive the first DC voltage and output the DC voltage. The grid-tie module may include a plurality of input stages. Each of the plurality of input stages may comprise: an AC-DC converter to receive the grid voltage and output a second DC voltage; and a DC-AC converter coupled to the AC-DC converter to receive the second DC voltage and output the high frequency AC voltage. A first EV charger may comprise a plurality of output stages. A controller may configure the first EV charger to cascade the plurality of output stages to provide the DC voltage comprising a charging voltage.

In an example, the at least one high frequency transformer comprises a single transformer having a single primary winding coupled to the grid-tie module and a plurality of secondary windings, where each of the plurality of secondary windings is coupled to one of the plurality of EV chargers.

In an example, the EV charging system further comprises a controller to control a first EV charger to provide a first DC voltage at a charging voltage level to a first EV charging dispenser in a first mode and to provide a second DC voltage at a charging current level to the first EV charging dispenser in a second mode. The controller may select one of the first mode and the second mode based at least in part on status information of an EV coupled to the first EV charging dispenser. The controller may control the grid-tie module to compensate for one or more of reactive power, harmonic current, or voltage sag.

In an example, the EV charging system further comprises a storage converter coupled to the at least one high frequency transformer. The storage converter may receive energy from a storage device coupled to the EV charging system and convert the energy to a second high frequency AC voltage, and provide the second high frequency AC voltage to the at least one high frequency transformer.

In yet another aspect, a method includes: receiving, in an EV charging system directly coupled to a distribution grid network, a grid voltage at a grid frequency; converting, in a first input stage of the EV charging system, the grid voltage to a first high frequency AC voltage; transforming the first high frequency AC voltage to a second high frequency AC voltage; converting, in a first output stage of the EV charging system, the second high frequency AC voltage to a first DC voltage; and providing the first DC voltage to at least one EV charging station coupled to the EV charging system.

In an example, the method further comprises providing the first DC voltage to a plurality of EV charging stations coupled to the EV charging system. The method may further include: in a first mode, providing the first DC voltage at a charging voltage level to the at least one EV charging station based at least in part on status information of a first EV coupled to the at least one EV charging station; and in a second mode, providing the first DC voltage at a charging current level to the at least one EV charging station based at least in part on status information of a second EV coupled to the at least one EV charging station.

In yet a further aspect, a method includes: receiving, in an EV charging system directly coupled to a distribution grid network, EV power from an EV coupled to the EV charging system; converting, in a first output stage of the EV charging system coupled to the EV, a DC voltage of the EV power to a second high frequency AC voltage; transforming the second high frequency AC voltage to a first high frequency AC voltage; converting, in a first input stage of the EV charging system coupled to the distribution grid network, the first high frequency AC voltage to a grid voltage and a grid frequency; and providing power to the distribution grid network from the first input stage, the power at the grid voltage and the grid frequency.

In an example, the method further comprises: providing the power to the distribution grid network in a reverse mode; and receiving grid power from the distribution grid network and using the grid power to provide a DC voltage to at least one other EV in a forward mode.

In an example, the method further comprises: communicating information between a controller of the EV charging system and the EV; based at least in part on the information, determining that the EV is capable of providing the EV power; and configuring circuitry of the EV charging system for the reverse mode in response to the determining.

In another aspect, an EV charging system comprises: a plurality of first converters to receive grid power at a distribution grid voltage and convert the distribution grid voltage to at least one second voltage; a single high frequency transformer coupled to the plurality of first converters to receive the at least one second voltage and to output at least one high frequency AC voltage; and a plurality of port rectifiers coupled to a plurality of secondary windings of the single high frequency transformer, each of the plurality of port rectifiers comprising a unidirectional AC-DC converter to receive the at least one high frequency AC voltage and convert the at least one high frequency AC voltage to a DC voltage. At least some of the plurality of port rectifiers are coupled in series to provide at least one of a charging current or a charging voltage to at least one dispenser to which at least one EV is to couple.

In an example, the EV charging system further comprises a solid state circuit breaker to disable at least one of the plurality of port rectifiers. The solid state circuit breaker may comprise one or more of the plurality of first converters. The EV charging system may further include a controller, where the controller is to disable at least one gate signal to one or more of the plurality of first converters in response to detection of a fault.

In an example, the plurality of port rectifiers may be a plurality of passive rectifiers. And the EV charging system may further include a controller to control at least some of the plurality of first converters to cause the plurality of passive rectifiers to provide the at least one of the charging current or the charging voltage. The plurality of first converters may each comprise a grid-side converter to convert an AC voltage of the grid power to a DC voltage and a high frequency converter to convert the DC voltage to a high frequency AC voltage.

In an example: in a first mode, the controller is to control the grid-side converter of the at least some of the plurality of first converters to cause the plurality of passive rectifiers to provide the at least one of the charging current or the charging voltage; and in a second mode, the controller is to control the high frequency converter of the at least some of the plurality of first converters to cause the plurality of passive rectifiers to provide the at least one of the charging current or the charging voltage.

In an example, the at least one dispenser comprises a plurality of dispensers coupled to the plurality of unidirectional rectifiers, where the plurality of dispensers are to receive a fixed voltage from the plurality of unidirectional rectifiers and provide a requested charge level to one or more EVs. The EV charging system may further include at least one platform coupled to the EV charging system. The at least one platform may include: a DC-DC converter to receive the charging voltage and output a DC charging voltage or a charging current; a plurality of switches coupled to the DC-DC converter; a plurality of dispensers each coupled to one of the plurality of switches, where each of a plurality of EVs is to couple to one of the plurality of dispensers; and a controller to selectively cause the DC charging voltage or the charging current to be provided to at least some of the plurality of dispensers in sequence. The controller may selectively switch the DC charging voltage or the charging current from being provided to a first dispenser of the plurality of dispensers to being provided to a second dispenser of the plurality of dispensers in response to at least one of a temperature of a battery of a first EV coupled to the first dispenser or a state of charge of the battery of the first EV reaching a threshold level.

In another aspect, a method comprises: receiving, in a controller of an EV charging system, an indication of connection of at least one EV to a dispenser coupled to the EV charging system; determining a charging level to be supplied to the at least one EV; and based at least in part on the charging level, controlling one or more of the plurality of first converters to supply the charging level to the at least one EV. In an example, the EV charging system comprises: a plurality of first converters to receive grid power from a distribution network; a high frequency transformer coupled to the plurality of first converters; and a plurality of unidirectional rectifiers coupled to the high frequency transformer.

In an example, controlling the one or more of the plurality of first converters comprises sending gate control signals to a front-end converter of the one or more of the plurality of first converters, to cause the one or more of the plurality of unidirectional rectifiers to supply the charging level to the at least one EV. The method may further comprise: measuring a current at at least one of the plurality of first converters; measuring a voltage at at least one of the plurality of first converters; determining a control value based at least in part on the measured current and the measured voltage; and generating the gate control signals based at least in part on the control value.

In an example, controlling the one or more of the plurality of first converters comprises controlling a duty cycle of a high frequency converter of the one or more of the plurality of first converters, to cause the one or more of the plurality of unidirectional rectifiers to supply the charging level to the at least one EV. The method may further comprise: supplying the charging level to a first EV, until at least one of a temperature of a battery of the first EV or a state of charge of the battery of the first EV reaches a threshold level; and thereafter supplying the charging level to another EV. The method may further comprise controlling a switching network of a fleet charger comprising the dispenser to supply the charging level to the first EV and thereafter to supply the charging level to the another EV.

In yet another aspect, an EV charging system comprises: a grid-tie module comprising a plurality of grid-side converters to receive grid power at a distribution grid voltage and convert the distribution grid voltage to a plurality of DC voltages and a plurality of high frequency converters to convert the plurality of DC voltages to a plurality of first high frequency AC voltages; a single high frequency transformer having: a plurality of primary windings each coupled to one of the plurality of high frequency converters to receive a corresponding one of the plurality of first high frequency AC voltages; and a plurality of secondary windings each to output one of a plurality of second high frequency AC voltages; and a plurality of port rectifiers coupled to the plurality of secondary windings, each of the plurality of port rectifiers comprising a unidirectional AC-DC converter to receive one of the plurality of second high frequency AC voltages and convert the one second high frequency AC voltage to a DC voltage, where at least some of the plurality of port rectifiers are coupled together to provide at least one of a charging current or a charging voltage; and at least one dispenser coupled to the plurality of port rectifiers, where the at least one dispenser is to provide the at least one of the charging current or the charging voltage to at least one EV.

In an example, the EV charging system further comprises a controller to control the grid-tie module to cause the at least some of the plurality of port rectifiers to provide the least one of the charging current or the charging voltage to the at least one EV. The controller may control a duty cycle of at least some of the plurality of high frequency converters to cause the at least some of the plurality of port rectifiers to provide the least one of the charging current or the charging voltage to the at least one EV. The at least one dispenser may provide the at least one of the charging current or the charging voltage to the at least one EV comprising a medium duty or a heavy duty EV, to charge the at least one EV to at least an 80% charge level within approximately 30 minutes or less.

DETAILED DESCRIPTION

In various embodiments, an electric vehicle (EV) charging system is provided that enables direct connection to a grid network and generates from received grid power one or more sources of charging power that can be provided to one or more EV charging stations. In this way, EVs connected to an EV charging station can be efficiently charged at a charging voltage and/or charging current that may be dynamically controlled.

Figure 1A:
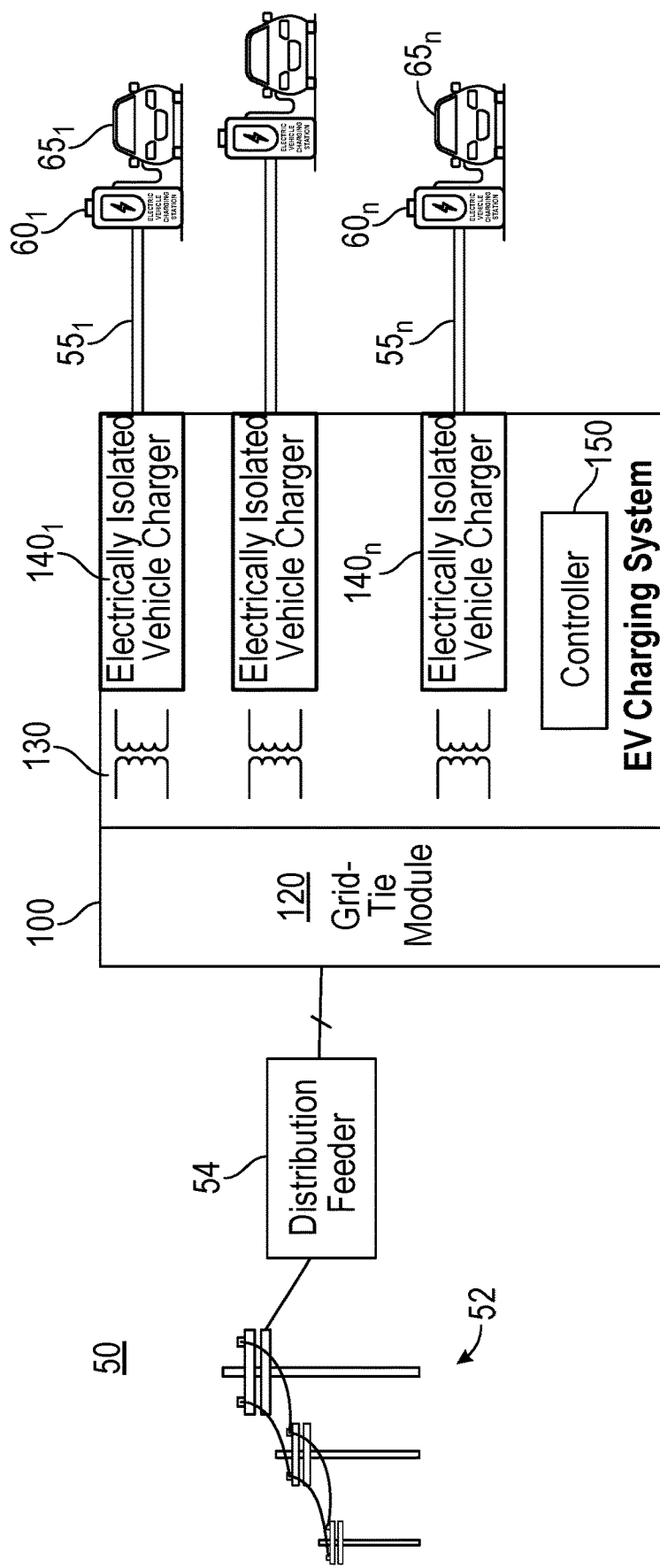
FIG. 1A is a block diagram illustrating an environment in which an EV charging system accordance with an embodiment may be used.

Referring now to FIG. 1A, shown is a block diagram illustrating an environment in which an EV charging system in accordance with an embodiment may be used. More particularly in FIG. 1A, an EV charging system 100, which may be a distributed modular-based charging system, couples between a grid network 50 (represented by transmission lines 52 and a distribution feeder 54) and multiple EV charging stations $60_1$-$60_n$ (also referred to herein as "dispensers"), each of which may be implemented with one or more EV distributors to enable charging of an EV (representative EVs $65_1$-$65_n$ are shown in FIG. 1A).

More specifically, embodiments may be used for use with distribution grid networks that provide power at medium voltage levels (e.g., between approximately 1000 volts (V) and 35000V) and at a low frequency (e.g., 50 or 60 Hertz (Hz)). For ease of discussion, understand that the terms "grid," "grid network" or "distribution grid network" are to be used interchangeably to refer to a power distribution system that provides medium voltage power at low frequency. With embodiments herein, an EV charging system such as charging system 100 may directly couple to a medium voltage distribution grid network (which may be an AC voltage grid or a DC voltage grid) without an intervening power transformer. Stated another way, embodiments provide an EV charging system that can be adapted to couple to a distribution grid network without a step up transformer, also known as a power or distribution transformer.

In this way, EV charging system 100 may directly receive incoming grid power with a grid voltage at a medium voltage level and a low frequency. As used herein, the terms "direct connection" and "direct coupling" with respect to an EV charging system mean that this system receives distribution grid power at a distribution grid network-provided grid voltage at a distribution grid network low frequency without presence of intervening components. Note that an EV charging system may couple to a grid network through a line reactor, a fuse, a circuit breaker, and/or a power circuit disconnect, and still be considered to be in a "direct coupling" with the grid network.

With embodiments, a means is provided for charging electric vehicles or other moving objects. In implementations, high power fast charging may be provided for electric vehicles by connecting to a medium voltage AC or DC distribution feeder. With an EV charging system as described herein, use of components including large magnetics components such as distribution transformer and in-line reactors may be avoided.

Charging system 100 may be implemented as a modular facility. Still further with embodiments herein in which the need for a power transformer is avoided, EV charging system 100 may be implemented with a relatively small and low cost arrangement. For example, in embodiments herein an EV charging system having a total apparent power of 5 megavolt amperes (MVA) may be configured in one or more modular cabinets having approximate dimensions of 2 meters (m)×1.6 m×2.4 m. Thus without the need for a power transformer, an EV charging system may be readily adapted in many different locations such as densely populated urban areas, shopping centers, big box stores, and so forth. In addition, a charging system for EV charging stations may be designed to be power dense and efficient. For purposes of operation, maintenance and packaging, modular and scalable power conversion blocks may be used, and can be the foundation for enabling advanced loads. As such, embodiments provide a modular, power-dense, and efficient power conversion system for EV charging stations.

In industrial power conversion applications, low voltage is typically most cost-efficient at low power levels, while medium voltage is typically superior at high power levels. With embodiments herein, a power density of an EV charging system can be up to 10× greater than an EV charging station having a power transformer (at its input) and a low voltage power conversion scheme. As one example, a power conversion scheme at 12470V versus 480V will require 26 times (12470V/480V=26) less current. Since conductor capacity is determined by $I^2R$ (where I is current and R is resistance), an equivalent 480V charging system would be required to implement conductors that are 675 times larger than conductors for a medium voltage EV charging system in accordance with an embodiment. Continuing with this example, a 1 MW 480V charging system may have a rated current of approximately 1200 amperes root mean squared (Arms), whereas a 1 MW 12470V charging system in accordance with an embodiment may have a rated current of approximately 46.3 Arms. Furthermore, low voltage transformer cost/size typically increases significantly above 1 MVA, such that a typical maximum transformer size for a low voltage charging station is 1 MVA. Thus embodiments may enable lower cost, lower size, lower complexity charging stations that realize greater charging capacity.

Still with reference to FIG. 1A, distribution feeder 54 of grid network 50 may be a medium voltage AC or DC distribution feeder. As illustrated, distribution feeder 54 is directly coupled to EV charging system 100 via three-phase connections.

Charging system 100 includes a grid-tie module 120. In embodiments herein, grid-tie module 120 may be configured to receive grid power at an incoming grid voltage (which as described above may be an AC or DC voltage) and perform an initial conversion of the incoming grid voltage to a voltage that is at different magnitude and/or frequency. Depending on implementation, grid-tie module 120 may convert the incoming grid voltage to one or more DC or AC voltages at different magnitude or frequency. To this end, grid-tie module 120 interfaces with medium voltage AC or DC grid network 50 and utilizes power electronics converters to convert the AC or DC grid voltage to a voltage that is at different magnitude and/or frequency. Grid-tie module 120 may include multiple stages that may be isolated from each other. In other implementations, at least some of these stages may be cascaded together to increase voltage capabilities.

In particular embodiments herein, grid-tie module 120 may include power electronics-based converters to convert the incoming AC or DC grid voltage. As an example, grid-tie module 120 may include so-called H-bridge power converters to receive the incoming grid voltage and perform a voltage/frequency conversion, e.g., to a DC voltage. In turn, grid-tie module 120 may further include a first stage of a DC-DC converter to convert the DC voltage to a high frequency AC voltage (e.g., a square wave voltage) at a given high frequency (e.g., between 5 kilohertz (kHz) and 100 kHz).

As further illustrated in FIG. 1A, this high frequency AC voltage may be provided to a transformer network 130. In the embodiment shown in FIG. 1A, transformer network 130 includes multiple isolated transformers, each having a single primary winding and a single secondary winding. In other implementations a transformer network may take the form of a single transformer having a single primary winding and multiple secondary windings.

In either case, transformer network 130 is configured as a high frequency transformer. In embodiments, transformer network 130 may operate at frequencies between approximately 5 kHz and 100 kHz. By virtue of this high frequency of operation, the need for large magnetics at a front end can be avoided. In one implementation transformer network 130 may have a size of less than approximately 1 m×1 m×0.25 m. Transformer network 130 outputs galvanically isolated AC voltages. In this way, transformer network 130 provides electrical isolation between distribution feeder 54 and EV charging stations 60.

Still referring to FIG. 1A, the secondary windings of transformer network 130 each may be coupled to an electrically isolated vehicle charger $140_1$-$140_n$. In embodiments herein, each vehicle charger 140 may be configured as a power electronics converter that converts the secondary voltage output by transformer network 130 to a voltage (e.g., DC) at a different frequency and/or magnitude. More particularly for vehicle charging as described herein, vehicle chargers 140 may include DC-DC converters to provide charge capabilities to at least one EV charging station 60.

Continuing with the above discussion in which an AC voltage is output from transformer network 130, vehicle chargers 140 may include an AC-DC converter as well as a DC-DC converter to provide charging capability at a desired charging voltage and/or charging current.

Figure 1B:
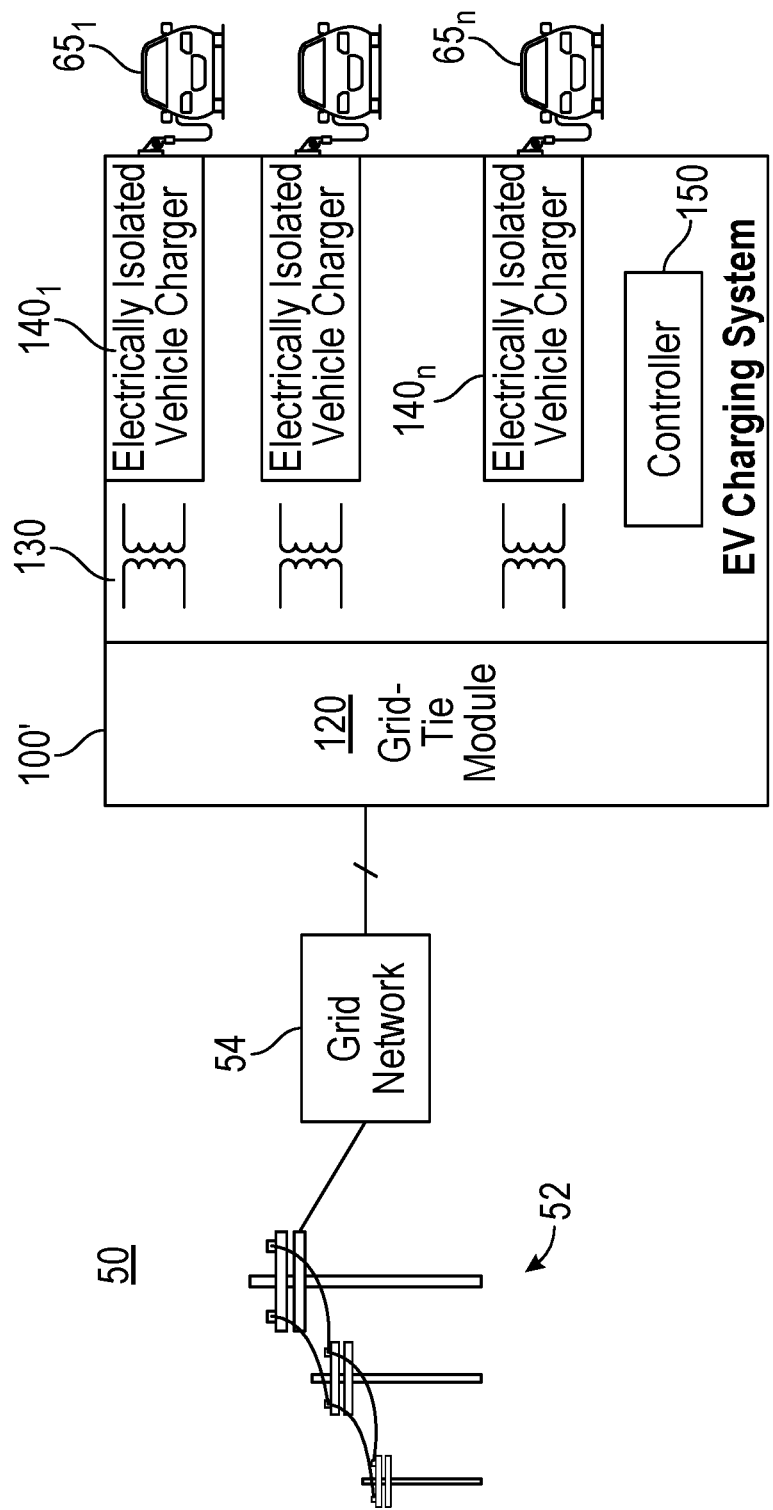
FIG. 1B is a block diagram illustrating another environment in which an EV charging system accordance with an embodiment may be used.

As shown in FIG. 1A, EV charging system 100 may be coupled to charging stations 60 via a plurality of output lines $55_{1-n}$. Although different connection topologies are possible (including direct connection as shown in FIG. 1B, discussed below), FIG. 1A shows an implementation in which each output line 55 is dedicated to a single charging station 60.

To effect control of EV charging system 100, at least one controller 150 may be present. In various embodiments, controller 150 may include one or more central processing units (CPUs) or systems on chip (SoCs), a dedicated microcontroller or other programmable hardware control circuit such as programmable logic. In one embodiment, controller 150 may form a distributed control architecture. In any case, controller 150 may be configured to execute instructions stored in one or more non-transitory storage media. Such instructions may cause controller 150 to automatically and dynamically control charging voltages and/or charging currents depending upon capabilities and requirements of charging stations 60 and/or connected EVs 65.

Controller 150 may be configured to control, in addition to one or more configurable charging modes, one or more generation and/or storage modes, in which energy stored in one or more batteries of an EV may be stored within a storage within or coupled to EV charging system 100 (such as one or more batteries (not shown for ease of illustration in FIG. 1A)) or provided as energy to the grid, e.g., via connection to distribution feeder 54, as will be described further herein.

Although shown with this particular implementation in the embodiment of FIG. 1A, many variations and alternatives are possible. For example, an EV charging system may be configured to directly connect to EVs. Referring now to FIG. 1B, shown is a block diagram illustrating another environment in which an EV charging system in accordance with an embodiment may be used. More particularly in FIG. 1B, an EV charging system 100' may be configured the same as system 100 of FIG. 1A, with the sole difference being that system 100' provides vehicle charging connectors integrated therein such that output lines 55 and charging stations 60 may be eliminated. Thus as shown in FIG. 1B, system 100', via chargers 140 and integrated charging connectors, directly connect to EVs 65.

In still further implementations an EV charging system also may include capabilities to provide load power to a variety of AC loads, such as industrial facilities or so forth. In addition, the EV charging system may be configured to receive incoming energy, such as from one or more photovoltaic arrays or other solar panels and provide such energy, either for storage within the EV charging system, distribution to the grid and/or as charging power to connected EVs.

Figure 2:
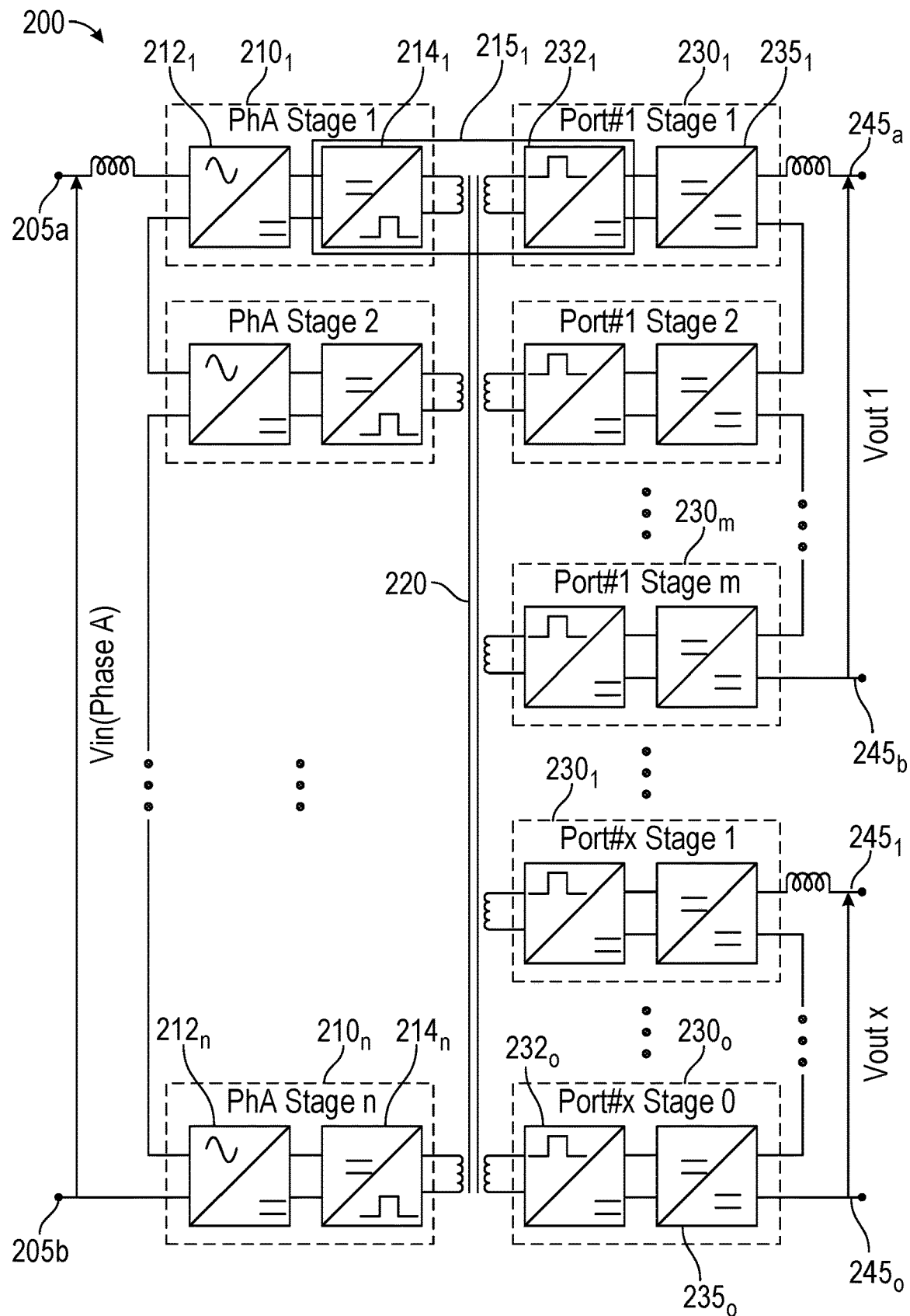
FIG. 2 is a block diagram of an EV charging system in accordance with a particular embodiment.

As described above, different configurations of EV charging systems are possible. Referring now to FIG. 2, shown is a block diagram of an EV charging system in accordance with a particular embodiment. As shown in FIG. 2, EV charging system 200 is a multi-port modular power converter that uses a single transformer. In FIG. 2, understand that a single phase is illustrated for ease of discussion. In a given charging system there may be three phases, each configured as shown in FIG. 2 or combined as a single transformer.

Incoming grid power is received at a given grid voltage via input nodes 205a, 205b. Although embodiments are not limited in this regard, in FIG. 2 this grid voltage may be received as a medium AC voltage, e.g., at a voltage of between approximately 1 and 50 kilovolts (kV) and at a grid frequency of 50 Hz or 60 Hz. As shown, an input inductance couples to input node 205a.

The incoming voltage is provided to a plurality of input stages, each of which may include multiple H-bridge converters. More specifically, a plurality of input stages $210_1$-$210_n$ are shown that are cascaded together. Each input stage may include a grid-side converter 2121-$n$ (shown as an AC-DC converter). In turn each grid-side converter 212 couples to a DC-AC converter $214_1$-$214_n$ of a given DC-DC converter $215_1$-$215_n$. Thus each grid-side converter 212 receives an incoming grid AC voltage and converts it to a DC voltage, e.g., at the same or different voltage magnitude. While embodiments may typically implement converters 212 and 214 (and additional converters described below) that are symmetric, it is also possible for there to be asymmetric configurations across power stages.

In an embodiment, each grid-side converter 212 may be implemented as an H-bridge converter including low voltage or medium voltage switches, e.g., silicon carbide (SiC) devices. In other embodiments, each grid-side converter 212 may be formed as a multi-level rectifier. The resulting DC voltages are in turn provided to corresponding DC-AC converters 214 that act as an input stage of an isolated DC-DC converter 215. In embodiments, converters 214 may be implemented as H-bridge converters to receive the DC voltage and convert it to a high frequency AC voltage, e.g., operating at a frequency of up to 100 kHz. While a square wave implementation is shown in FIG. 2, understand that in other cases the AC voltage may be sinusoidal.

The high frequency voltage output from converters 214 may be provided to a corresponding primary winding of a transformer 220, namely a high frequency transformer. While shown in FIG. 2 as a single transformer with multiple primary windings and multiple secondary windings, in other implementations separate transformers may be provided, each with one or more primary windings and one or more secondary windings.

In any event, the galvanically isolated outputs at the secondary windings of transformer 220 may be provided to a plurality of output stages $230_1$-$230_o$. As such each output stage 230 includes an AC-DC converter $232_1$-$232_o$ (of a DC-DC converter 215). Thereafter, the output DC voltage may be further adjusted in magnitude in corresponding load-side converters $235_1$-$235_o$ (and $235_1$-$235_o$).

As illustrated, output stages 230 thus include a given output stage (namely stage 232) of a DC-DC converter 215 and a load-side converter 235. As shown in FIG. 2, multiple output stages 230 may couple together in cascaded fashion (e.g., either in a series connection as shown in FIG. 2 or in a parallel connection) to provide a higher output voltage and/or current depending upon load requirements. More specifically, a first set of output stages $230_1$-$230_m$ are cascaded together and couple to output nodes $245_{a,b}$. In turn, a second set of output stages $230_1$-$230_o$ are cascaded together and couple to output nodes $245_{1,o}$. The resulting outputs are thus at a given DC voltage level and may be used as a charging voltage and/or current for connected EVs. While this particular arrangement with cascaded input and output stages are shown in FIG. 2, understand that a multi-port power converter may be implemented in other manners such as using modular high frequency transformers. Still further, understand that the actual included DC-DC converters may have a variety of different topologies.

Figure 3:
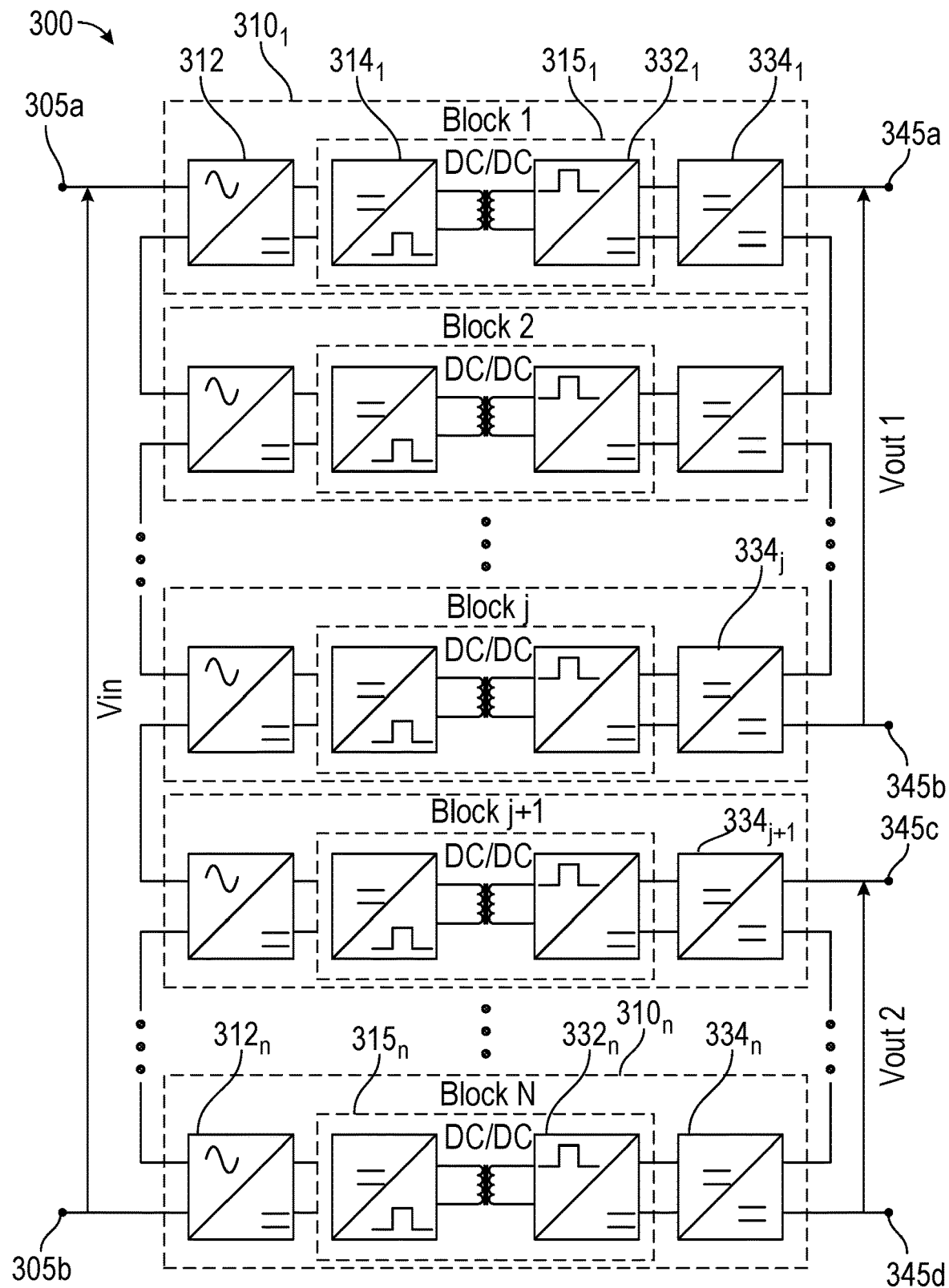
FIG. 3 is a block diagram of an EV charging system in accordance with another embodiment.

For example, in other cases a modular high frequency transformer may be used. Referring now to FIG. 3, shown is a block diagram of an EV charging system in accordance with another embodiment. As shown in FIG. 3, EV charging system 300 is a multi-port modular power converter that uses a modular transformer. As in FIG. 2, a single phase is illustrated for ease of discussion.

Incoming grid power is received at a given grid voltage via input nodes 305a, 305b. The incoming voltage is provided to a plurality of input stages, each of which may include multiple H-bridge converters. More specifically, a plurality of power converter stages $310_1$-$310_n$ are shown. Each stage 310 may include a grid-side converter $312_{1-n}$ (shown as an AC-DC converter) and a DC-AC converter $314_1$-$314_n$ of a given DC-DC converter $315_1$-$315_n$. Via independent transformers of DC-DC converters 315, a resulting electrically isolated DC voltage is provided to an AC-DC converter $332_1$-$332_n$ and thereafter to a load-side converter $334_1$-$334_n$. Note that operation may be similar to that discussed in FIG. 3. In one embodiment, each load-side converter $334_1$-$334_n$ may provide a voltage to the load, e.g., connected electric vehicles. However here note that potentially different amounts of load-side converters 334 may be cascaded to provide a given DC voltage to a load (e.g., EV charging station). As one example, a first set of load-side converters $334_1$-$334_j$ may provide a first charging voltage of approximately 1500 volts via output nodes 345a,b. And a second set of load-side converters $334_{j+1}$-$334_n$ may provide a second charging voltage of approximately 1000 volts via output nodes 345c,d.

Figure 4A:
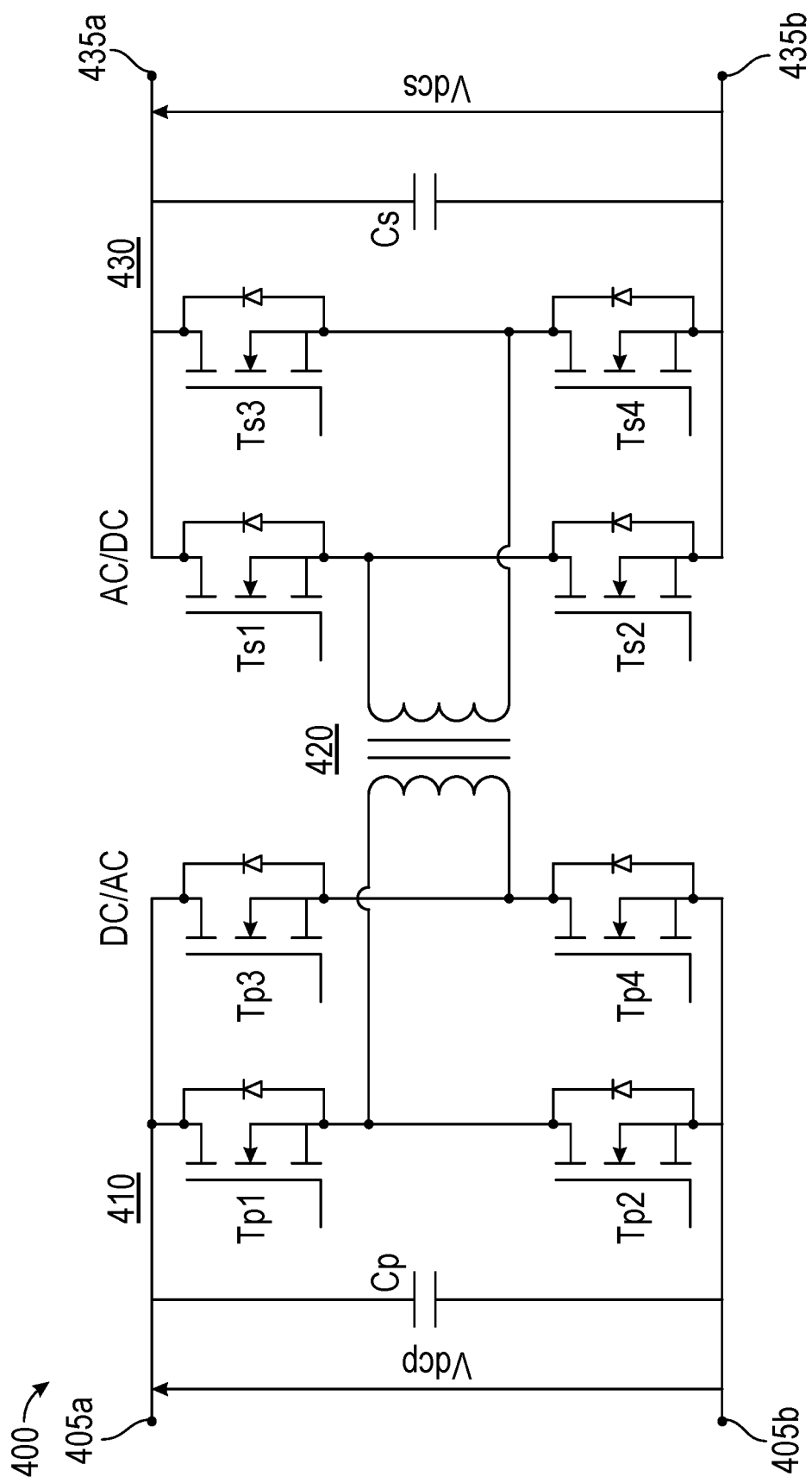
FIG. 4A is schematic diagram of an example DC-DC converter in accordance with an embodiment.

Referring now to FIG. 4A, shown is a schematic diagram of an example DC-DC converter in accordance with an embodiment. As shown in FIG. 4A, DC-DC converter 400 is implemented as a dual active bridge (DAB) isolated DC-DC converter. In various implementations, converter 400 may be used in a multi-port modular power converter such as those shown above in FIGS. 2 and 3 and/or other EV charging systems.

In the high level shown in FIG. 4A, converter 400 includes an input stage 410 having a plurality of SiC switches Tp1-Tp4. As shown, switches Tp1-Tp4 are implemented in an H-bridge configuration and couple to input nodes 405a,b that receive an incoming DC voltage Vdcp. As shown, a parallel capacitance Cp couples between the input nodes. In turn, the midpoints between serially coupled SiC switches Tp1, Tp2 and Tp3, Tp4 couple to an input winding, namely a primary winding of a high frequency transformer 420. In embodiments herein, high frequency transformer 420 may be configured to operate at frequencies between approximately 5 kHz and 100 kHz.

Still in reference to FIG. 4A, the secondary winding of high frequency transformer 420 in turn couples to the midpoints of serially connected SiC switches Ts1, Ts2 and Ts3, Ts4 of an output stage 430. As illustrated, output stage 430 further includes a capacitance Cs coupled between output ports 435a,b that provide an output DC voltage Vdcs. It is noted that switches Tp1-Tp4 and Ts1-Ts4 can be any type of power semiconductor switches including Silicon (Si) or Silicon Carbide (SiC), Gallium Nitrite (GaN) metal oxide semiconductor field effect transistors (MOSFETs) or insulated gate bipolar transistors (IGBTs).

With this arrangement implementing SiC or other high speed silicon power switches, improved conversion efficiency may be realized as a result of lower switching losses. In one implementation, SiC devices as in FIG. 4A may be implemented with low voltage switches such as 1700V SiC MOSFETs. Use of low voltage switches reduces the stress on insulation, dv/dt and parasitic capacitances, along with high reliability.

In addition, thermal management may be simplified, e.g., resulting in smaller and less expensive heat sinks or cooling systems, and/or replacement of fluid/forced air with natural cooling. Still further with embodiments, passive components (inductors, capacitors) may be downsized at higher switching frequencies. For example, with reference back to FIG. 4A, the input and output side capacitances may be on the order of approximately 40 microFarads. Also with a DAB design as in FIG. 4A, a power converter may be realized with greater simplicity and controllability, low switching losses, low sensitivity to system parasitic elements, bidirectional power flow, and the possibility to achieve Zero Voltage Switching (ZVS) for all semiconductors to allow for a high switching frequency and efficiency.

Figure 4B:
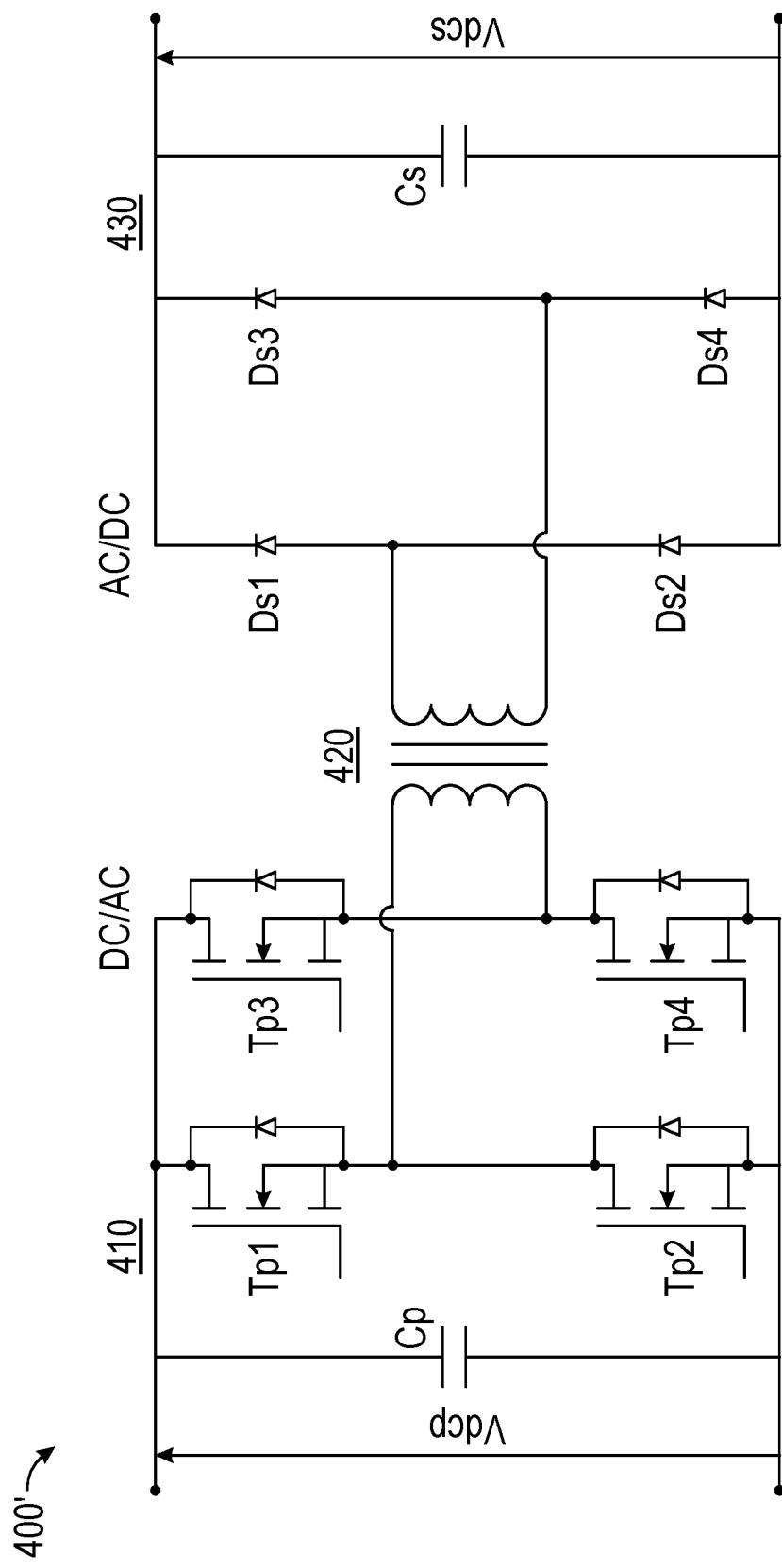
FIG. 4B is schematic diagram of an example DC-DC converter in accordance with another embodiment.

Referring now to FIG. 4B, shown is a schematic diagram of an example DC-DC converter in accordance with another embodiment. As shown in FIG. 4A, DC-DC converter 400' may be have a front end implemented the same as converter 400 of FIG. 4A. however here, the secondary side is implemented with passive devices, namely diodes Ds1-Ds4. With this implementation, power flow is unidirectional from grid to EV's, such that reverse power flow from EV to grid does not occur here.

Figure 5:
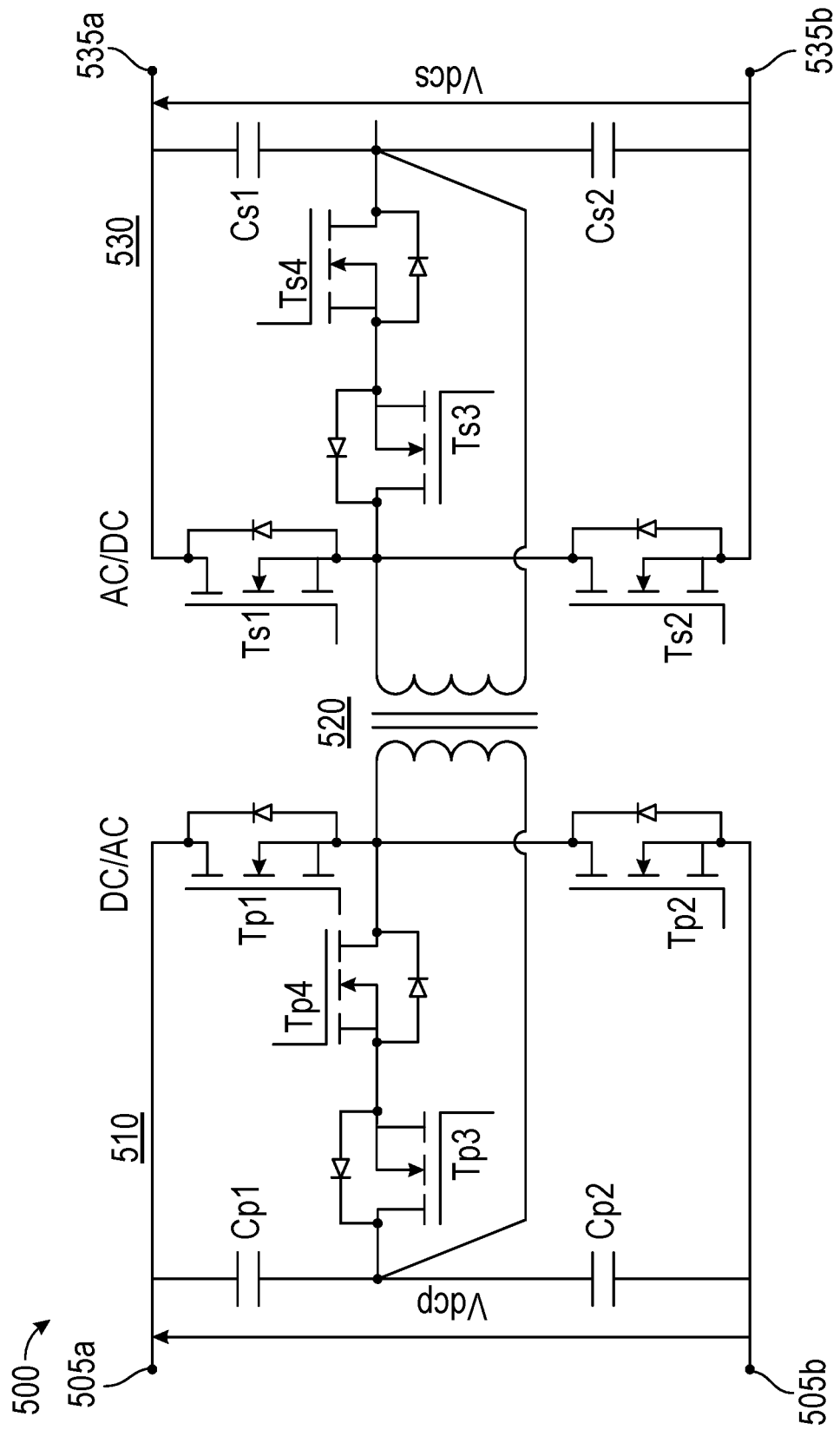
FIG. 5 is a schematic diagram of an example DC-DC converter in accordance with yet another embodiment.

In another embodiment, a DC-DC converter may take the form of a T-type bidirectional isolated DC-DC converter. Referring now to FIG. 5, shown is a schematic diagram of an example DC-DC converter in accordance with yet another embodiment. While formed of SiC devices, note the topology in FIG. 5 has SiC devices Tp1 and Tp2 coupled in series between input nodes 505a,b, and SiC devices Tp3 and Tp4 coupled in series between an input winding of a transformer 510 and input capacitors Cp1, Cp2. Similarly an output stage 530 has a T-type arrangement of SiC devices Ts1-Ts4 that providing switching between a secondary winding of transformer 520 and output nodes 535a,b having an output capacitance Cs1, Cs2 coupled therebetween. As above, switches Tp1-Tp4 and Ts1-Ts4 can be any type of power semiconductor switches including Si,SiC, and/or GaN MOSFETs or IGBTs. Of course other implementations of DC-DC converters are possible in other embodiments.

Figure 6:
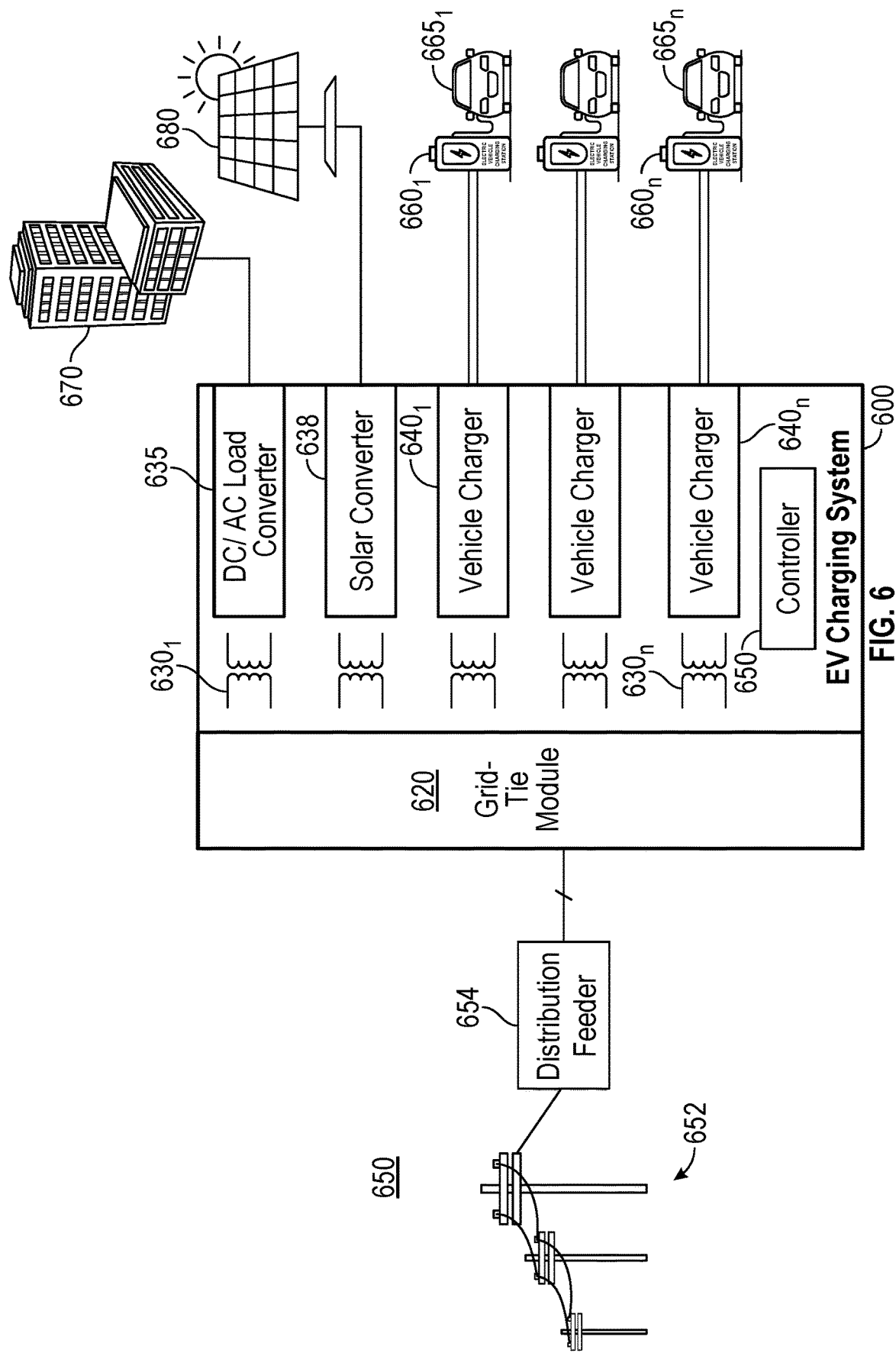
FIG. 6 is a block diagram illustrating an environment in which an EV charging system in accordance with another embodiment may be used.

Referring now to FIG. 6, shown is a block diagram illustrating an environment in which an EV charging system in accordance with another embodiment may be used. More particularly in FIG. 6, an EV charging system 600 may be generally similarly configured the same as EV charging system 100 of FIG. 1A (and thus reference numerals generally refer to the same components, albeit of the "600" series in place of the "100" series of FIG. 1A). However in this embodiment, system 600 includes at least one DC-AC load converter 635 to provide AC power to a facility 670. As further shown, system 600 also includes a solar converter 638 that may couple to a solar photovoltaic panel 680. In this way, incoming solar energy can be provided to grid network 650, to EV charging stations 660 and/or stored in an energy storage (such as a battery system of system 600 (not shown for ease of illustration in FIG. 6)). Thus with this embodiment, EV charging system 600 may couple to one or multiple AC or DC loads and/or to one or multiple solar photovoltaic panels.

Figure 7:
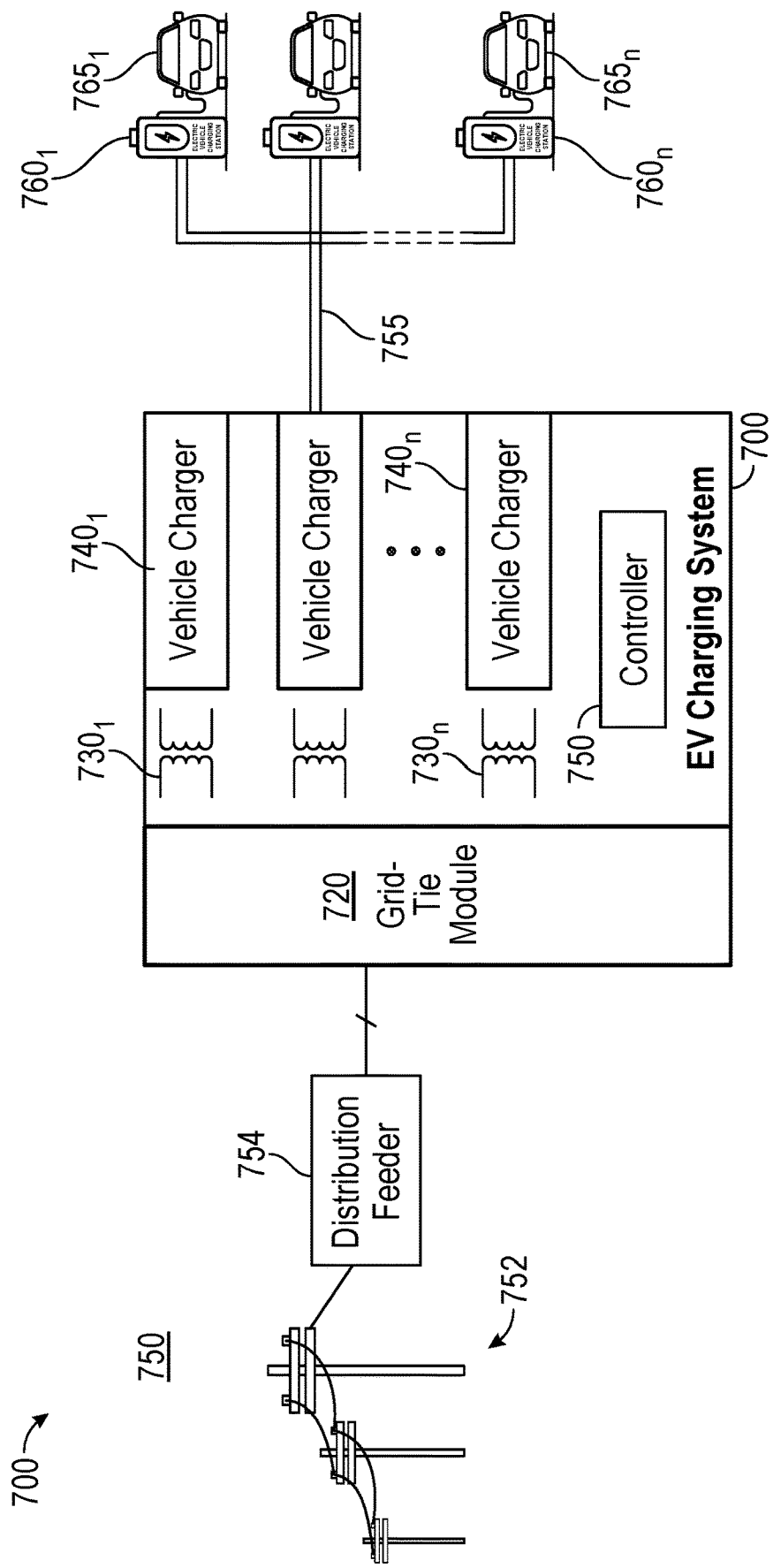
FIG. 7 block diagram illustrating an environment in which an EV charging system in accordance with a further embodiment may be used.

Still further implementations are possible. For example, isolated vehicle charger section can interface with multiple EV charging dispensers. Referring now to FIG. 7, shown is a block diagram illustrating an environment in which an EV charging system in accordance with a further embodiment may be used. More particularly in FIG. 7, an EV charging system 700 may be generally similarly configured the same as EV charging system 100 of FIG. 1A (and thus reference numerals generally refer to the same components, albeit of the "700" series in place of the "100" series of FIG. 1A). However in this arrangement, EV charging system 700 may be configured such that a single vehicle charger 740 couples via output lines 755 to multiple EV charging dispensers 760.

In yet other embodiments, an EV charging system may provide volt-ampere reactive power compensation to a utility that enables maximum power to be delivered to the charging system without exceeding distribution feeder capacity.

Figure 8:
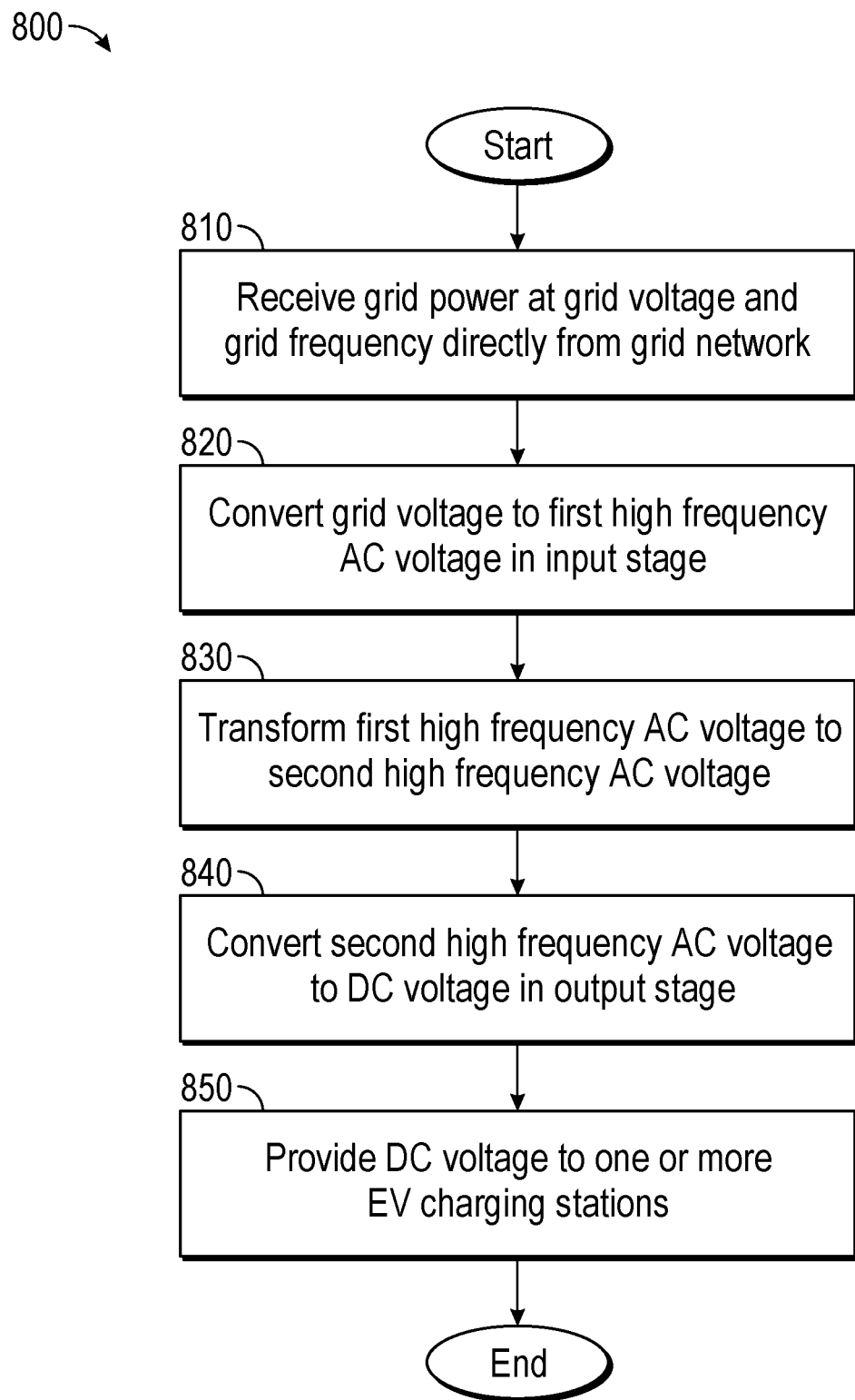
FIG. 8 is a flow diagram of a method in accordance with an embodiment.

Referring now to FIG. 8, shown is a flow diagram of a method in accordance with an embodiment. As shown in FIG. 8, method 800 is a method for controlling an EV charging system in accordance with an embodiment. As an example, method 800 may be performed by an EV charging system such as any of those described above. In part, method 800 may be executed using instructions stored in one or more non-transitory storage media such as may be executed by a hardware circuit (e.g., a CPU, SoC, microcontroller, or so forth). In other implementations, a pure hardware-based arrangement may be present in which an EV charging system is hard-wired for a particular configuration. And of course, varying degrees of programmability and configurability may be present in different implementations.

As illustrated, method 800 begins by receiving grid power at a grid voltage and a grid frequency (block 810). In an embodiment, this grid power (at medium voltage) may be directly received from a distribution grid network in a grid-tie module of an EV charging system. Next at block 820 the grid voltage is converted to a first high frequency AC voltage. More particularly, in an input stage, e.g., of the grid-tie module, the incoming grid voltage (e.g., at a voltage up to 50 kV and at a grid frequency of 50 Hz or 60 Hz) may be converted to an AC voltage at a frequency between approximately 5 kHz and 100 kHz.

Still referring to FIG. 8, next at block 830 this first high frequency AC voltage is transformed to a second high frequency AC voltage. Note that this transformation, which may be performed in one or more high frequency transformers, acts to provide electrically isolated high frequency AC voltages to different EV chargers. Then at block 840 the second high frequency AC voltage is converted to a DC voltage. More specifically, in an output stage, e.g., of an EV charger, the second high frequency AC voltage is converted to a DC voltage at a given charging voltage and/or current. Finally, at block 850 this DC voltage is provided to one or more EV charging stations that may use the voltage to charge one or more connected EVs.

Note that the level of the DC voltage and its provision for charging one or more connected EVs may be based at least in part on communications with the EV. For example, when an EV is plugged into an EV charging system with minimal charge remaining in its battery (and communicates status information including its current capacity) the controller may cause the DC voltage to be provided as a charging current to realize faster charging. Then when the battery is closer to a full charge (and updated status information is communicated), the controller may cause the DC voltage to be provided as a charging voltage to complete the charge. Understand while shown at this high level in the embodiment of FIG. 8, many variations and alternatives are possible.

Further understand that in different implementations, an EV charging system may provide fast charging higher power levels, resulting in fast charging with potentially dramatically reduced charge times. As one example, an extreme fast charging system in accordance with an embodiment may operate a power levels of 350 kiloWatts (kW) or more, and be capable of effecting a charge time of approximately 15 minutes or less for a 200 mile capacity. In contrast, conventional EV fast chargers that operate up to approximately 140 kW may incur over 35 minutes for an equivalent charge. Thus embodiments that directly couple to a medium voltage distribution grid may provide significantly faster charging times, with a smaller, cheaper charging system.

In many regions, the cost of electricity varies with conditions, including demand. Oftentimes, electricity is cheaper at night than during at least certain hours of the day. Some consumers having EVs may take advantage of this situation by charging their EV at night (e.g., using a low voltage home charger) when costs are lower. Then when electricity prices are higher during peak demand hours (e.g., daytime), a consumer may choose to discharge stored energy from the EV to the grid, e.g., via an EV charging system in accordance with an embodiment.

As such, embodiments may provide a mechanism for reverse power flow from an EV to a grid via an EV charging system that can be dynamically re-configured to provide at least partial reverse power flow. For example, one or more EVs may couple to an EV charging system to provide this power flow while at the same time, one or more other EVs coupled to the EV charging system receive charging power (e.g., in a fast charging mode at high power levels).

Figure 9:
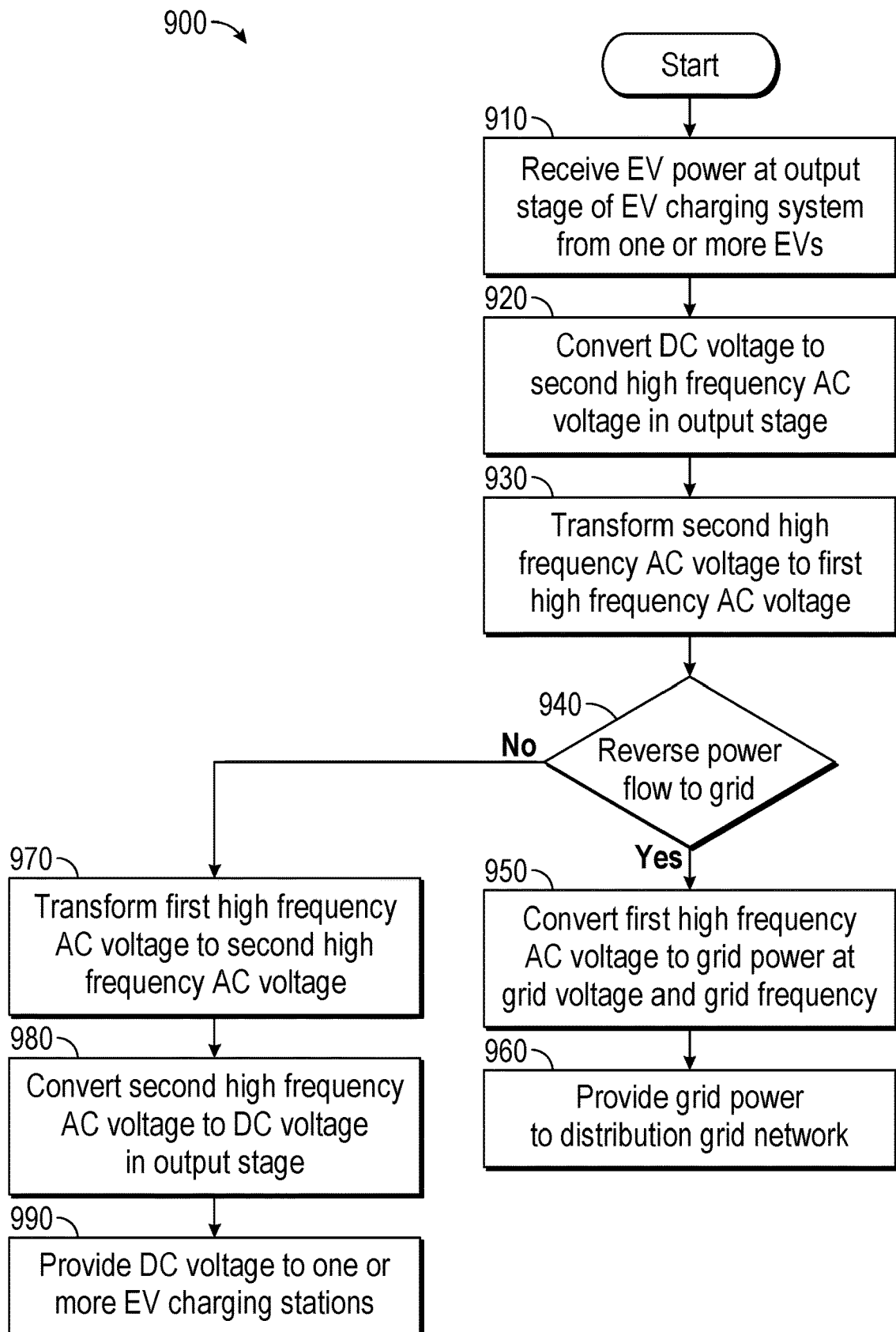
FIG. 9 is a flow diagram of a method in accordance with another embodiment.

Referring now to FIG. 9, shown is a flow diagram of a method in accordance with another embodiment. More specifically, method 900 of FIG. 9 is a method for providing a reverse power flow, namely from a battery or other energy storage device(s) of one or more EVs to a distribution grid. As such, method 900 may be performed by an EV charging system such as any of those described above. In part, method 900 may be executed using instructions stored in one or more non-transitory storage media such as may be executed by any form of controller (such as described in FIGS. 1A and 8, for example).

As illustrated, method 900 begins by receiving EV power at an output stage of an EV charging system from one or more EVs (block 910). As an initial matter, note that prior to this reverse power flow, there are initial communications between the EV and the EV charging system (and more specifically, with the controller of the EV charging system) to provide capability information, including a desire to participate in this reverse power flow, battery status information, among potentially additional information such as safety status information (e.g., power connector engaged, vehicle ready, electrical insulation detection) and so forth. In turn, the controller may confirm that the EV is capable of such reverse power flow and determine appropriate parameters for this power delivery. Accordingly, the controller may configure, e.g., switching circuitry of an output stage of the EV charging system to receive this EV power and additional circuitry of the EV charging system to direct this power flow to an appropriate destination.

Still in reference to FIG. 9, next at block 920 this incoming DC voltage of the EV power may be converted in a load-side converter to a second high frequency AC voltage in the output stage. Such operation may proceed in a reverse direction as described above such that the incoming DC voltage is converted to an AC voltage at a given high frequency (e.g., 50 kHz). Thereafter, this second high frequency AC voltage is transformed to a first high frequency AC voltage in a transformer network of the EV charging system (block 930).

Still referring to FIG. 9, next at diamond 940 it may be determined whether this reverse power flow is intended to be provided to the grid. This determination may be based on a configuration setting of the EV charging system, either statically or dynamically. Such determination may be based on considerations as to whether the grid network is in need or desire of receiving such power. If so, control passes to block 950 where the first high frequency AC voltage can be converted to a grid power level. More specifically, the grid-tie module may provide the first high frequency AC voltage to a grid power level at a grid voltage and grid frequency. Thereafter, via the grid-tie module of the EV charging system, this grid power is provided to the distribution grid network (block 960).

In other cases it is possible for the reverse power flow received from an EV to be provided as charging power to one or more other EVs also connected to the EV charging system. In this instance, the control flow from diamond 940 instead proceeds to block 970. There, a first high frequency AC voltage (at the transformer network input side) is transformed to a second high frequency AC voltage (at the transformer network output side). Then at block 980 the second high frequency AC voltage is converted to a DC voltage. More specifically, in an output stage, e.g., of an EV charger, the second high frequency AC voltage is converted to a DC voltage at a given charging voltage and/or current. Finally, at block 990 this DC voltage is provided to one or more EV charging stations that may use the voltage to charge one or more connected EVs. Understand that in various use cases, one or more EVs can supply power to the grid while at the same time one or more other EVs may receive power from the grid, such that the grid supplies a difference between received and provided power. Understand that while shown at this high level in the embodiment of FIG. 9, variations and alternatives are possible.

Figure 10:
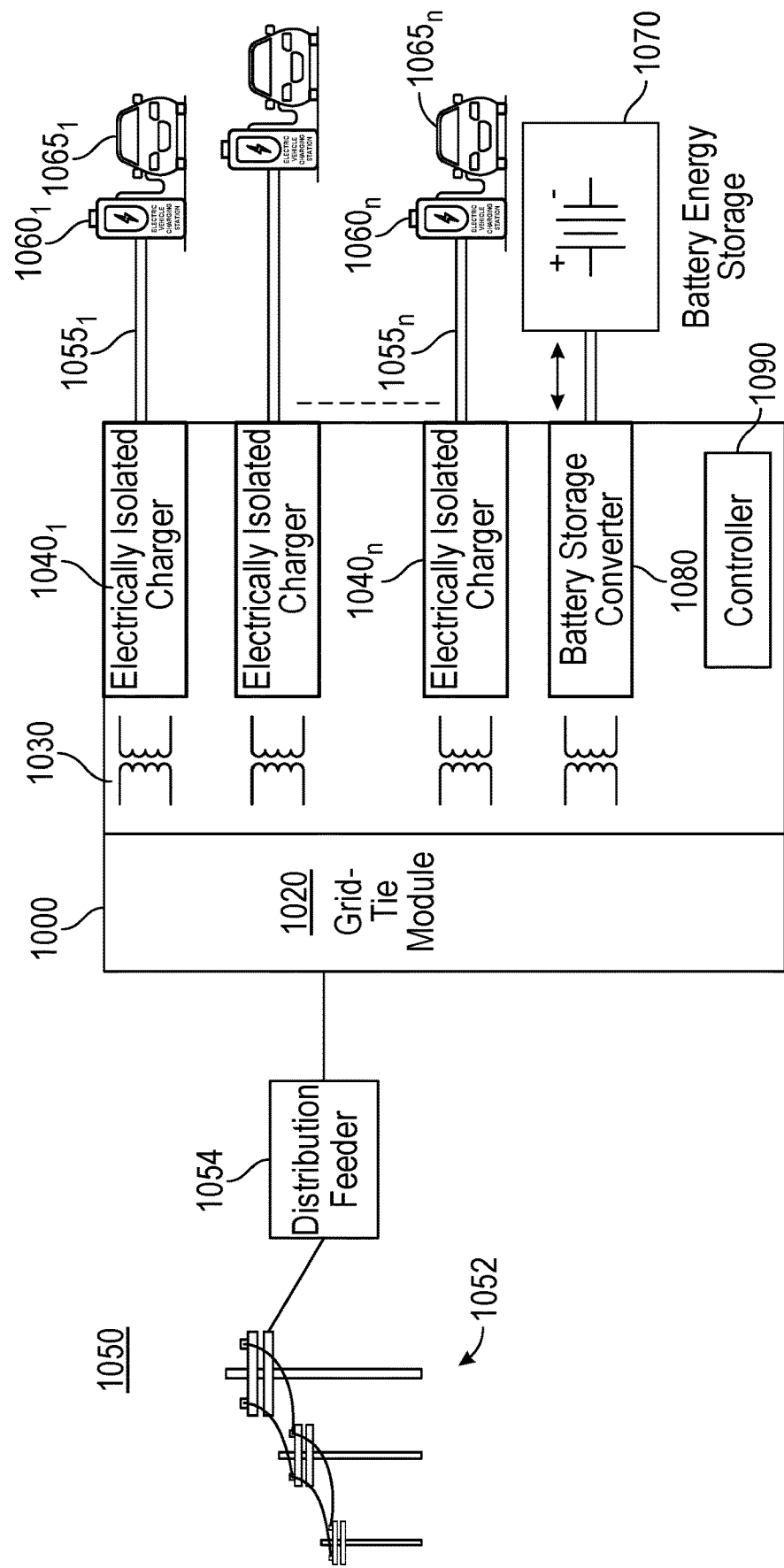
FIG. 10 is a block diagram illustrating another environment in which an EV charging system accordance with an embodiment may be used.

Referring now to FIG. 10, shown is a block diagram illustrating an environment in which an EV charging system in accordance with another embodiment may be used. More specifically as shown in FIG. 10, the EV charging system 1000 may be generally configured the same as EV charging system 100 of FIG. 1A (and thus reference numerals generally refer to the same components, albeit of the "1000" series in place of the "100" series of FIG. 1A). However, in this embodiment, note that EV charging system 1000 further includes a battery storage converter 1080. As shown, battery storage converter 1080 couples to a battery energy storage 1070. Note that while battery energy storage 1070 is a separate component coupled externally to EV charging system 1000, in other implementations battery energy storage 1070 may be included internally to EV charging system 1000.

In embodiments herein, battery storage converter 1080 may be configured to receive power from storage 1070 at a given DC voltage, and perform a conversion to an appropriate high frequency AC voltage, such that this voltage can be provided to transformer network 1030 and then in turn be provided to one or more EV chargers 1040 for use in generating a DC voltage for provision to a given EV charging station 1060. Of course it is possible to instead provide such battery power to distribution grid 1050 via a reverse flow technique such as discussed above, in other cases.

Note that depending on configuration, the received energy can be transformed and passed through to grid-tie module 1020 before being converted and directed to one or more EV charging stations 1060. Such operation may occur where there are multiple independent transformers as shown in FIG. 10. In an implementation with a single transformer, its magnetic circuitry may be sufficient that the transformed AC voltage from one secondary winding can be directed to one or more other secondary windings and without being passed to grid-tie module 1020.

Figure 11:
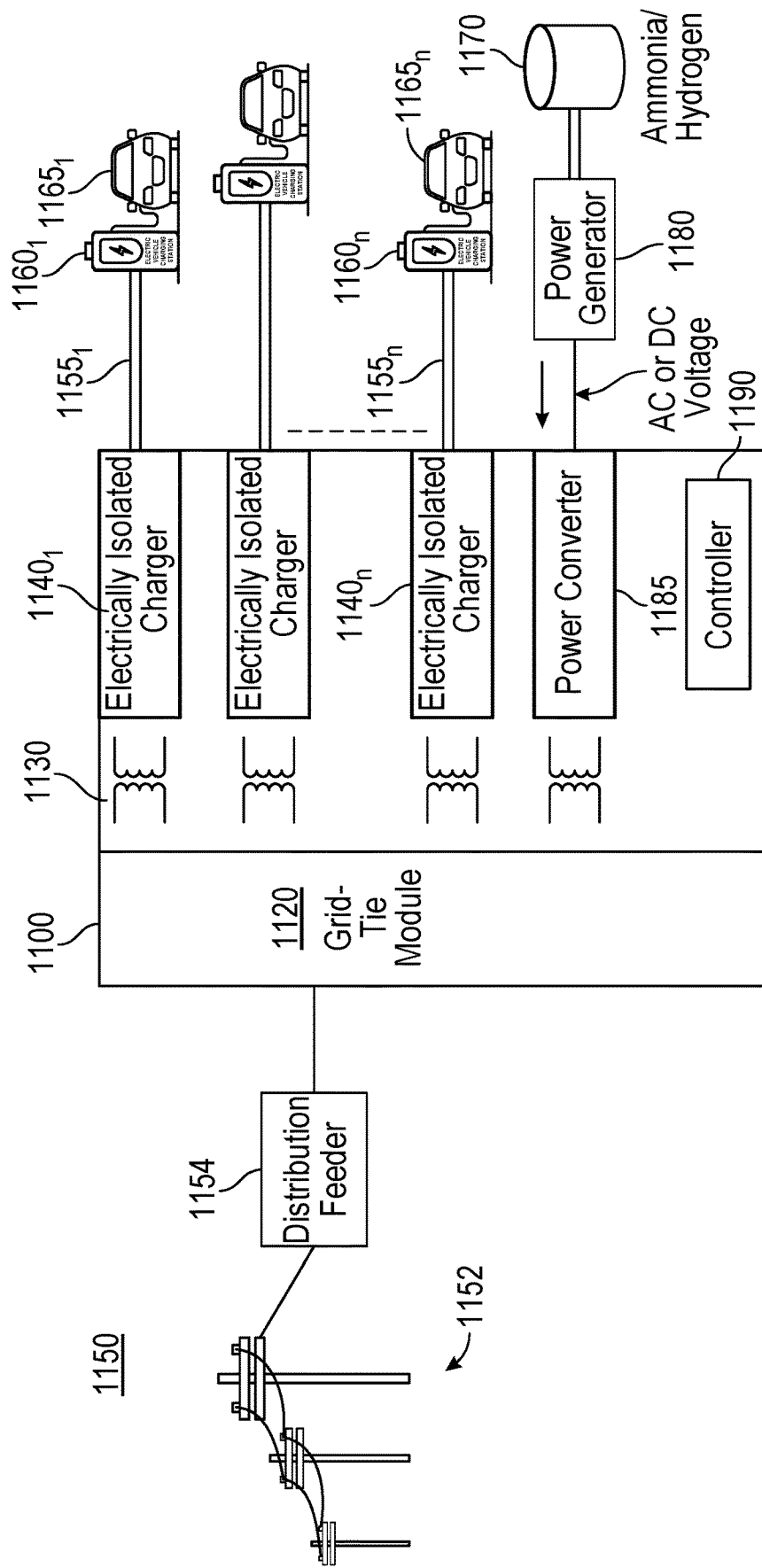
FIG. 11 is a block diagram illustrating yet another environment in which an EV charging system accordance with an embodiment may be used.

Referring now to FIG. 11, shown is a block diagram illustrating an environment in which an EV charging system in accordance with another embodiment may be used. More specifically as shown in FIG. 11, EV charging system 1100 may be generally configured the same as EV charging system 100 of FIG. 1A (and thus reference numerals generally refer to the same components, albeit of the "1100" series in place of the "100" series of FIG. 1A). However, in this embodiment, note that EV charging system 1100 further includes an power converter 1185. As shown, power converter 1185 couples to a power generator 1180.

Power generator 1180 may be configured to generate a low voltage AC or DC voltage. More particularly in embodiments, power generator 1180 may generate an output voltage at approximately 480 volts. As shown, power generator 1180 may generate power from a given energy source, which in this case is an ammonia/hydrogen source 1170.

In the embodiment of FIG. 11, power converter 1185 may convert this incoming voltage to an appropriate high frequency AC voltage, such that this voltage can be provided to transformer network 1130 and then in turn be provided to one or more EV chargers 1140 for use in generating a DC voltage for provision to a given EV charging station 1160. Of course it is possible to instead provide such low voltage power via a reverse flow technique such as discussed above to distribution grid 1150 in other cases.

Along with the increasing of electricity load type and capacity such as in connection with EV charging as described herein, power quality issues, especially reactive power and harmonics, may affect reliable operation of a power grid. Various control mechanisms may be used to compensate for such power quality issues. In contrast to conventional mechanisms which use additional components, no further components are needed. That is, conventional techniques to control reactive power in a grid network use a static synchronous compensator, which is a dynamic shunt compensator, or a static VAR compensator.

Instead with embodiments, a compensation control mechanism can effectively compensate the reactive power, suppress harmonic currents and provide voltage support for a grid network to which an EV charging system is coupled. Embodiments thus can provide charging power to multiple EVs, while concurrently improving power quality of the grid network, by effective reactive power and harmonics compensation at a grid connection. Thus a grid-tie module can exchange reactive power into a grid network to provide reactive power compensation at the grid connection. Such operation may occur concurrently with active power flow from the grid network to connected EVs or injection of reactive power into grid network. Accordingly, an EV charging system in accordance with an embodiment may provide dynamic reactive power compensation while concurrently providing charging power to one or more EVs.

More specifically, fast feedbacks and control loops, in combination with high speed switches of input and output stages, enable rapid compensation for reactive power and suppress harmonic currents. To this end, a controller may, based on feedback information, control phase shifting of the voltage of grid-side converters (e.g., converters 2121-$n$ in FIG. 2) of the inputs to one or more transformers of a transformer network, by appropriate control of switching devices of input stages within a grid-tie module.

In addition, embodiments can act quickly to supply reactive power to correct voltage sag (voltage dip) caused by temporary events including short circuits, overloads and starting electric motors. As an example, voltage sag may occur when RMS voltage decreases between approximately 10-90% of nominal voltage for one-half cycle to one minute. When a voltage sag is detected, a quick response can occur without the need for external compensation components. To this end, a controller may provide reactive power to accommodate for this condition by appropriate control of the voltage phase shift of the grid side converters within the input stages of transformer networks.

Figure 12:
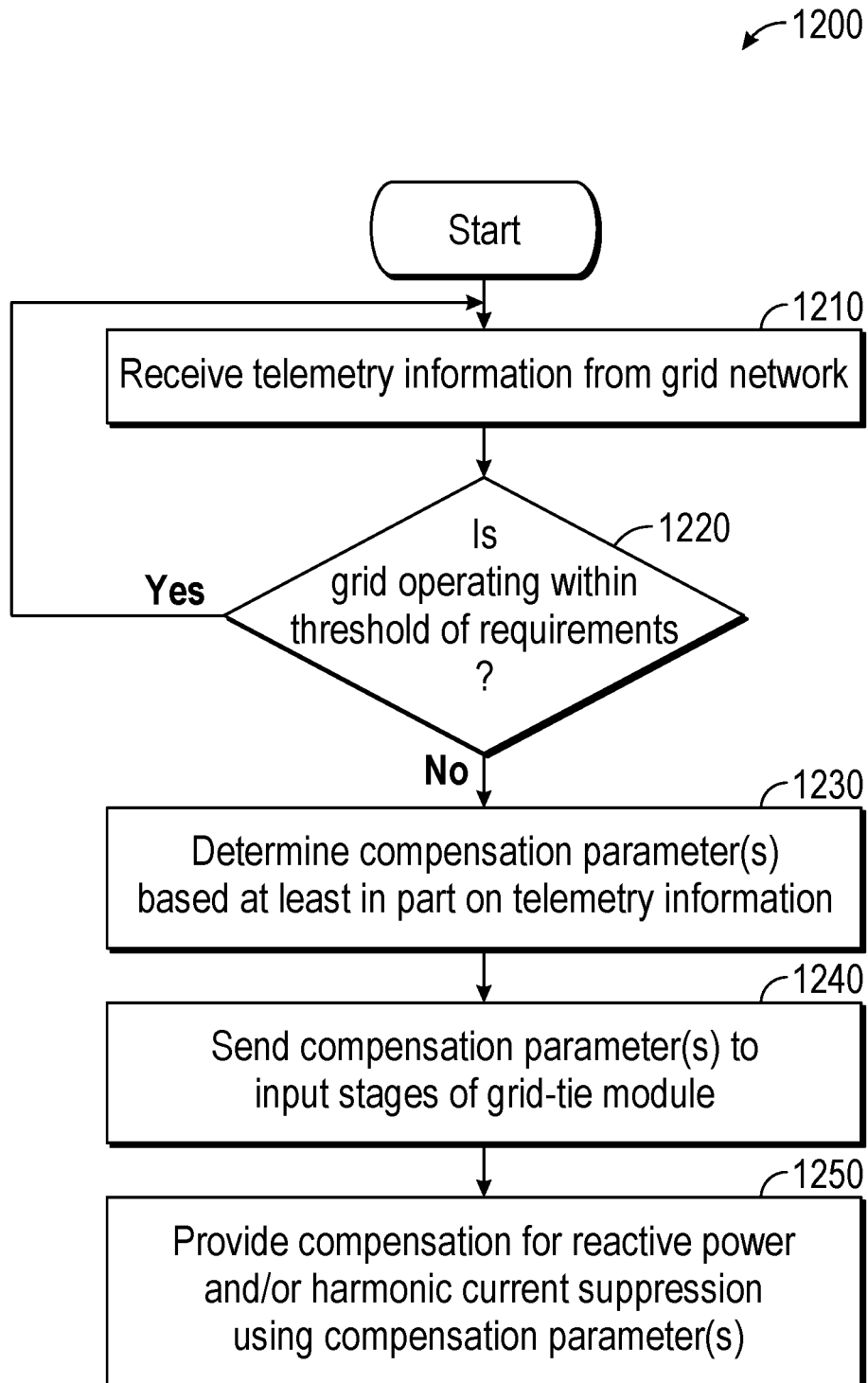
FIG. 12 is a flow diagram of a method in accordance with yet another embodiment.

Referring now to FIG. 12, shown is a flow diagram of a method in accordance with yet another embodiment. As shown in FIG. 12, method 1200 is a method for providing compensation to a distribution grid network via an EV charging system. As such, method 1200 may be performed by an EV charging system such as any of those described above. In part, method 1200 may be executed using instructions stored in one or more non-transitory storage media such as may be executed by any form of controller (such as described in FIGS. 1A and 8, for example).

As shown, method 1200 begins by receiving telemetry information from a grid network (block 1210). Next it is determined at diamond 1220 whether the grid is operating within at least a threshold of various requirements. Although embodiments are not limited in this regard, such requirements may include reactive power requirements, voltage sag requirements or so forth. If the grid is determined not to be operating within a threshold, control passes to block 1230. At block 1230, compensation parameters may be determined. More specifically, a controller may determine one or more compensation parameters based at least in part on the telemetry information. These compensation parameters may include, for example, a reactive power compensation percentage of total kiloVolt Ampere (kVA), or so forth.

Still in reference to FIG. 12, next control passes to block 1240 where these one or more compensation parameters may be provided to the input stages of a grid-tie module of the EV charging system. Note that these compensation parameters may be used to control switching devices within the grid-tie module. As such, by such configuring/re-configuring of various devices within the grid-tie module, at block 1250 the system may provide compensation for reactive power and/or harmonic current compression using the one or more compensation parameters. Understand while shown at this high level in the embodiment of FIG. 12, many variations and alternatives are possible.

As discussed above, EV charging systems may have different types of configurations. In some cases, an EV charging system may be implemented with an architecture that is dedicated only for providing charging to EVs. Such systems may have reduced costs and more simplified control arrangements. In some cases, these systems may be applicable for use with heavy and medium duty EVs. Heavy and medium duty EVs can have storage capacities ranging from 150 kWH to over 800 kWH. These EVs need charging systems that are designed to continuously supply high rates of DC power, e.g., from 250 kW to 1.5 MW on a continuous basis, with a target of 80% charge in 30 minutes.

Figure 13A:
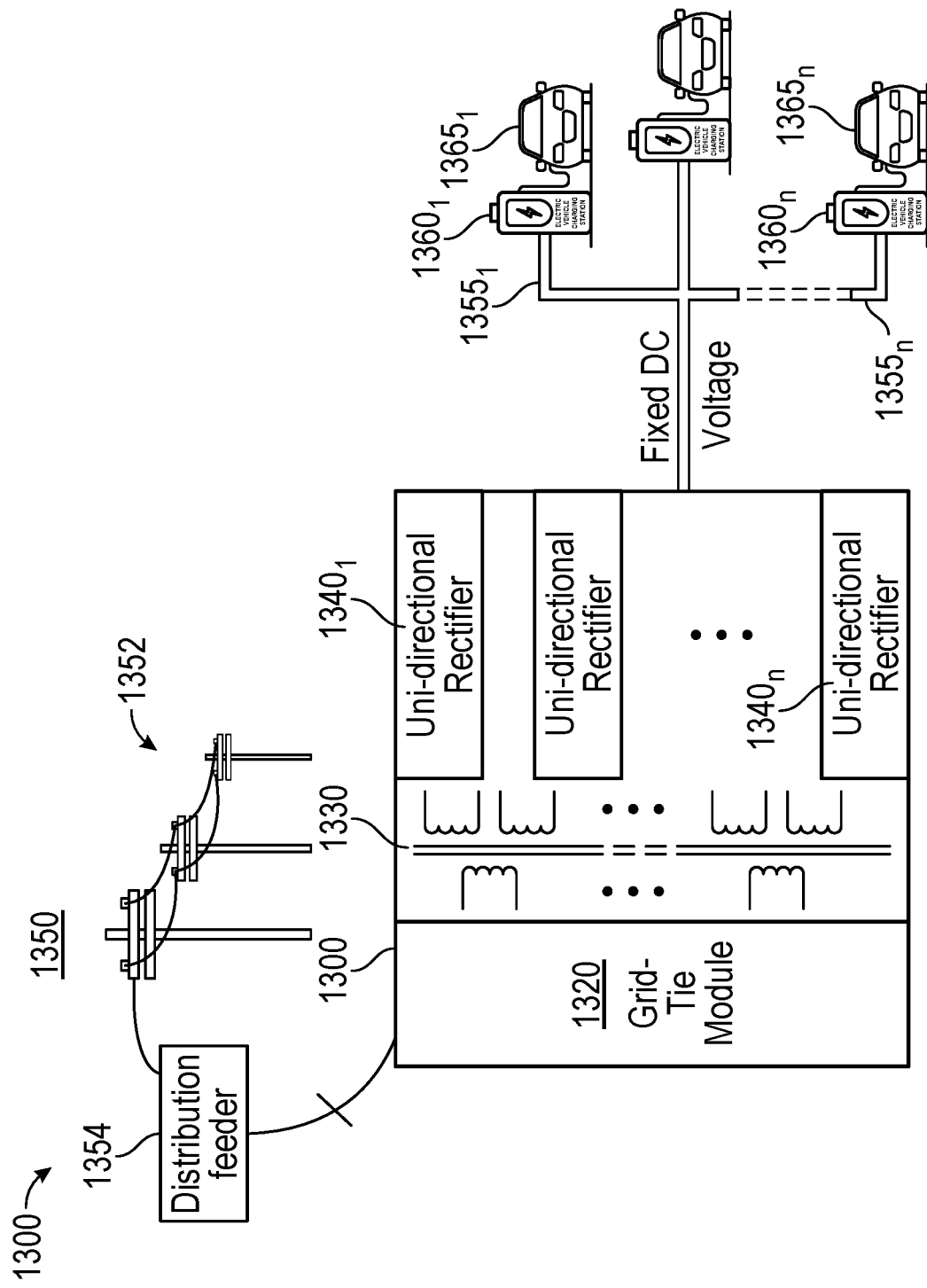
FIG. 13A is a block diagram illustrating another environment in which an EV charging system accordance with an embodiment may be used.

Referring now to FIG. 13A, shown is a block diagram illustrating another environment in which an EV charging system in accordance with an embodiment may be used. More specifically in FIG. 13A, an EV charging system 1300 couples between a grid network 1350 (represented by transmission lines 1352 and a distribution feeder 1354) and multiple EV charging stations 1360$i$-1360$n$ (dispensers 1360) each of which may couple to one or more EVs 1365$_{1-n}$.

As illustrated in FIG. 13A, EV charging system 1300 may generally be configured similarly to EV charging system 100 of FIG. 1A (and thus reference numerals generally refer to the same or similar components, albeit of the "1300" series in place of the "100" series of FIG. 1A).

However in this implementation, a transformer 1330 is implemented as a single high frequency transformer having multiple primary windings and multiple secondary windings. Each set of secondary windings in turn may couple to a corresponding unidirectional rectifier 1340$i$-1340$n$. By providing unidirectional rectifiers 1340, power flow occurs only in a single direction, namely from charging system 1300 to connected EVs 1365 as a given charging voltage or charging current.

Thus EV charging system 1300 couples directly to a distribution network and provides a regulated fixed DC voltage to one or more dispensers 1360. In one or more embodiments, dispensers 1360 may receive a fixed DC voltage (e.g., at 1000V) and provide an appropriate charge voltage or charge current as requested by each EV 1365. Note that dispensers 1360 may provide electrical isolation between each EV 1365.

Figure 13B:
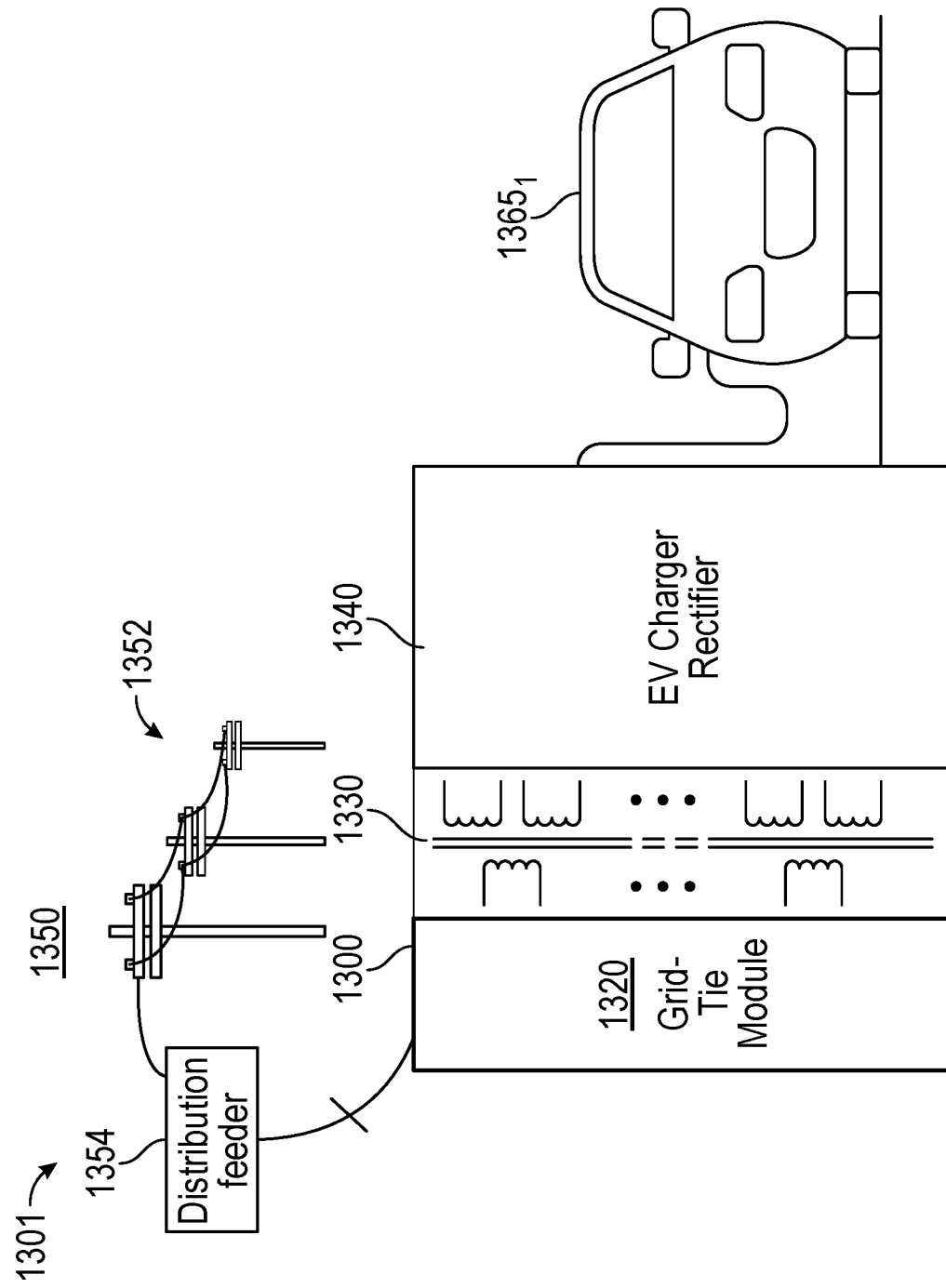
FIG. 13B is a block diagram illustrating a still other environment in which an EV charging system accordance with an embodiment may be used.

Other implementations may be used to provide high rates of charging power. Referring now to FIG. 13B, shown is a block diagram of an EV charging system in accordance with another embodiment. In FIG. 13B, EV charging system 1301 may generally include similar components as discussed above regarding FIG. 13A, and thus are shown with the same reference numbers as used in FIG. 13A, and such components are not further discussed. While shown as a single EV charger rectifier 1340, understand that EV charger rectifier 1340 may be formed of multiple rectifiers that are fed by different secondary windings of transformer 1330, and may be coupled in series or parallel.

In addition in this implementation, charging system 1301 includes an integrated dispenser (not separately shown) to which a medium or heavy duty EV 1365 may couple. As one example, charging system 1301 may be used for highway truck charging. With this arrangement, grid-tie module 1320 couples directly to a distribution grid at distribution voltage levels. Or in other implementations a dispenser can be placed at a distance. EV charging system 1301 may control the charge voltage or charge current via appropriate control of grid-tie module 1320, as described in more detail below.

Figure 13C:
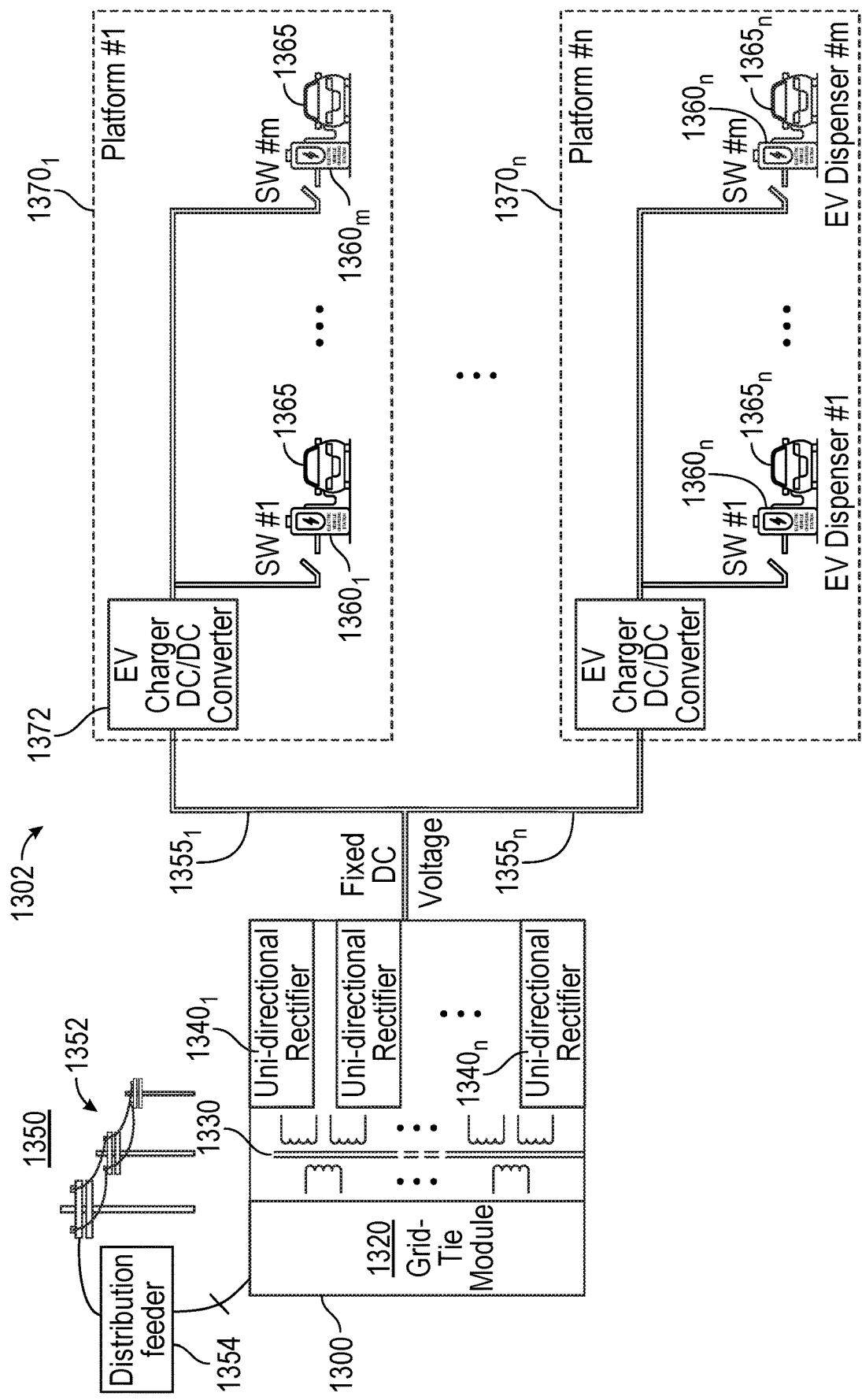
FIG. 13C is a block diagram illustrating yet another environment in which an EV charging system accordance with an embodiment may be used.

Yet other implementations are possible. Referring now to FIG. 13C, shown is a block diagram of an EV charging system in accordance with yet another embodiment. As shown in FIG. 13C, charging system 1302 may generally take the same form as in FIG. 13A, and thus is shown with the same reference numbers as used in FIG. 13A. However here, charging system 1302 provides for fleet EV charging. In this implementation, a plurality of charging platforms $1370_1$-$1370_n$ are coupled to receive a fixed DC voltage (e.g., 1500V) output from charging system 1302.

As shown with regard to representative charging platform $1370_1$, included is a DC/DC converter 1372 to which a plurality of switches (SW #1-SW #m) may couple. As such, EV charger DC/DC converter 1372 is shared among multiple EV dispensers 1360. As illustrated, each switch couples to a corresponding dispenser $1360_{1-m}$ to which a given EV 1365 (part of a EV fleet) may be coupled. EV charger DC/DC converter 1372 may provide isolation and a charging voltage or charging current requested by EV 1365

In this embodiment, charging system 1302 may provide a low-cost solution for fleet EV charging. The configuration can charge m×n EVs (where m is the number of dispensers per platform, and n is the number of platforms) during off duty (e.g., overnight). In operation, switches SW can switch on dispensers 1360 to charge EVs 1365 in sequence. The switches can be in the form of contactors, circuit breakers, or solid-state switches, and may be integrated in the dispenser or placed in another location within platform 1370. Using this configuration minimizes the required power rating of converters since the vehicles may charge in sequence. For example, charging system 1302 can be rated at 900 kW that provides 600A at 1500V DC. The EV charger DC/DC converter 1372 power rating can be 150 kW that can provide a maximum of 150 kW of power to EV 1365 that is being charged by selection of a given switch SW Furthermore a controller (e.g., a programmable logic controller) may control the charging functions of platforms 1370 based on temperature of EV battery or state of charge to optimize the battery life and/or charging times. This is so, since when the EV battery temperature rises, an EV slows down the charging to permit the battery to cool down, which may lengthen the charging time or reduce the life of the battery. By switching the charging between EV's 1365 of a platform based on temperature and/or state of charge, speed of charging in a platform increases and the life of the battery may extended.

Understand that variations and modifications of implementations of the embodiments described herein may lead to other fleet charging configurations. For example, a dispenser can have multiple charging cables (one or more charging cables that each cable may connect to each EV). In turn, some type of switching mechanism may reside inside the dispenser, and may be configured to reroute power to provide charge voltage (or charge current) sequentially, and/or based on battery temperature and/or state of charge, to EV's connected to each dispenser. Thus in one or more embodiments, a fleet charging station may have multiple platforms, with each platform having an EV charger DC/DC converter and one or more dispensers. Each dispenser can have multiple charging cables connected to multiple EVs. A switching mechanism may be configured to provide the required charge to each EV at a time. In an embodiment, to charge N EV's, there may be N switches. Depending on implementation, the switches that reroute the charge to each dispenser may reside in the EV charger enclosure, or in a separate enclosure within a platform or inside the dispenser. Switches that switch the power between the charging cables of a dispenser can be installed within the dispenser.

Figure 14:
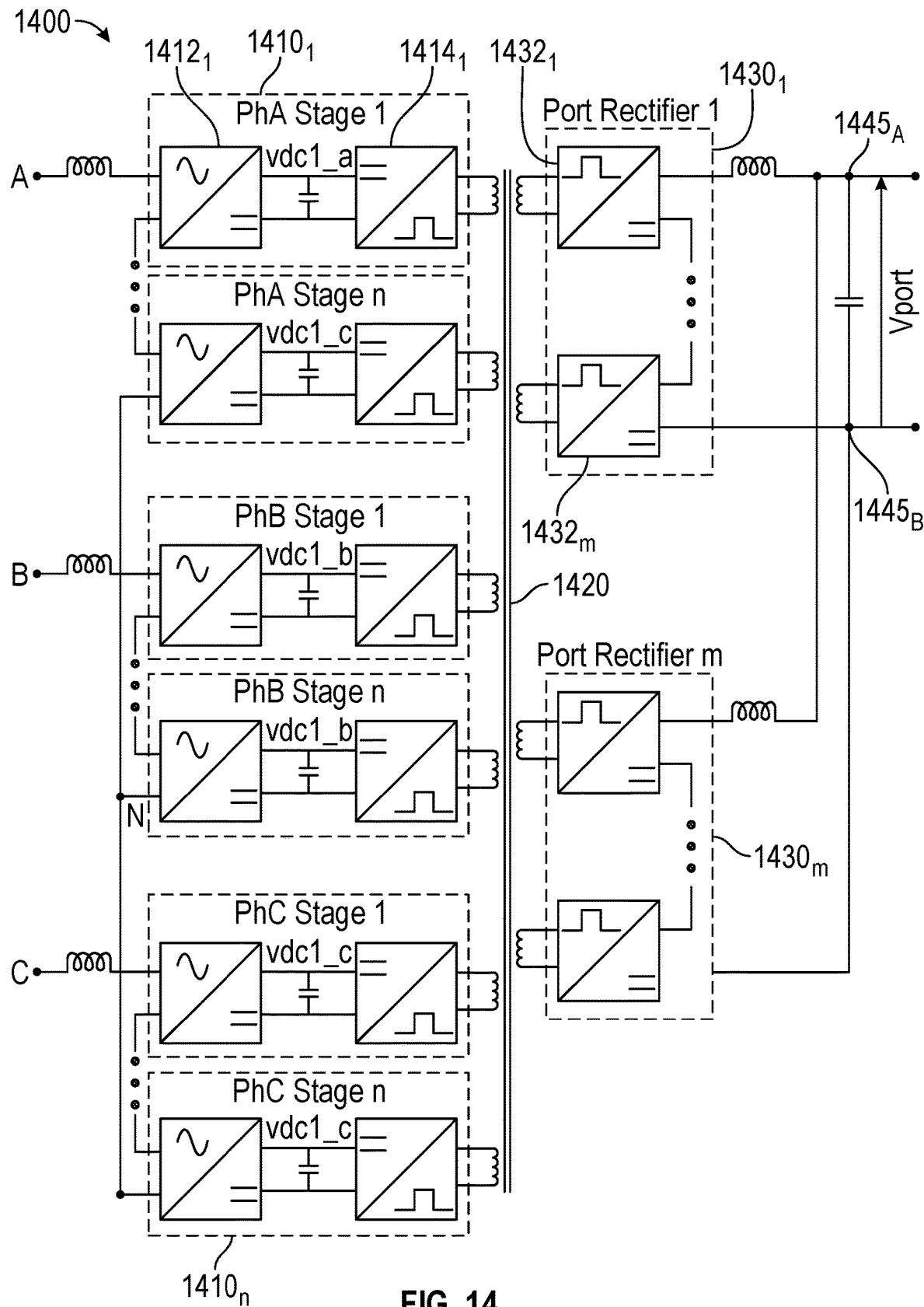
FIG. 14 is a block diagram of an EV charging system in accordance with another embodiment.

Referring now to FIG. 14, shown is a block diagram of an EV charging system in accordance with another embodiment. As shown in FIG. 14, EV charging system 1400 may be implemented similarly to EV charging system 200 of FIG. 2 (and thus reference numerals generally refer to the same or similar components, albeit of the "1400" series in place of the "200" series of FIG. 2). On an input side of a multi-winding transformer 1420, each input phase includes n power stages 1410$_1$-$n$ that are connected in series. Each power stage 1410 includes an AC/DC converter 1412, DC bus, and a DC-to-high frequency converter 1414 (also referred to as a "high frequency converter").

In this implementation, output stages are implemented as port rectifiers $1430_1$-$1430_m$. As shown, each port rectifier 1430 includes at least one AC-DC converter (e.g., AC-DC converters $1432_1$-$1432_m$). As illustrated in FIG. 14, multiple port rectifiers 1430 can couple in parallel to provide higher a charging current at output nodes $1445_{A,B}$. In other cases, port rectifiers 1430 may be coupled in series to provide a higher charging voltage.

Figure 15:
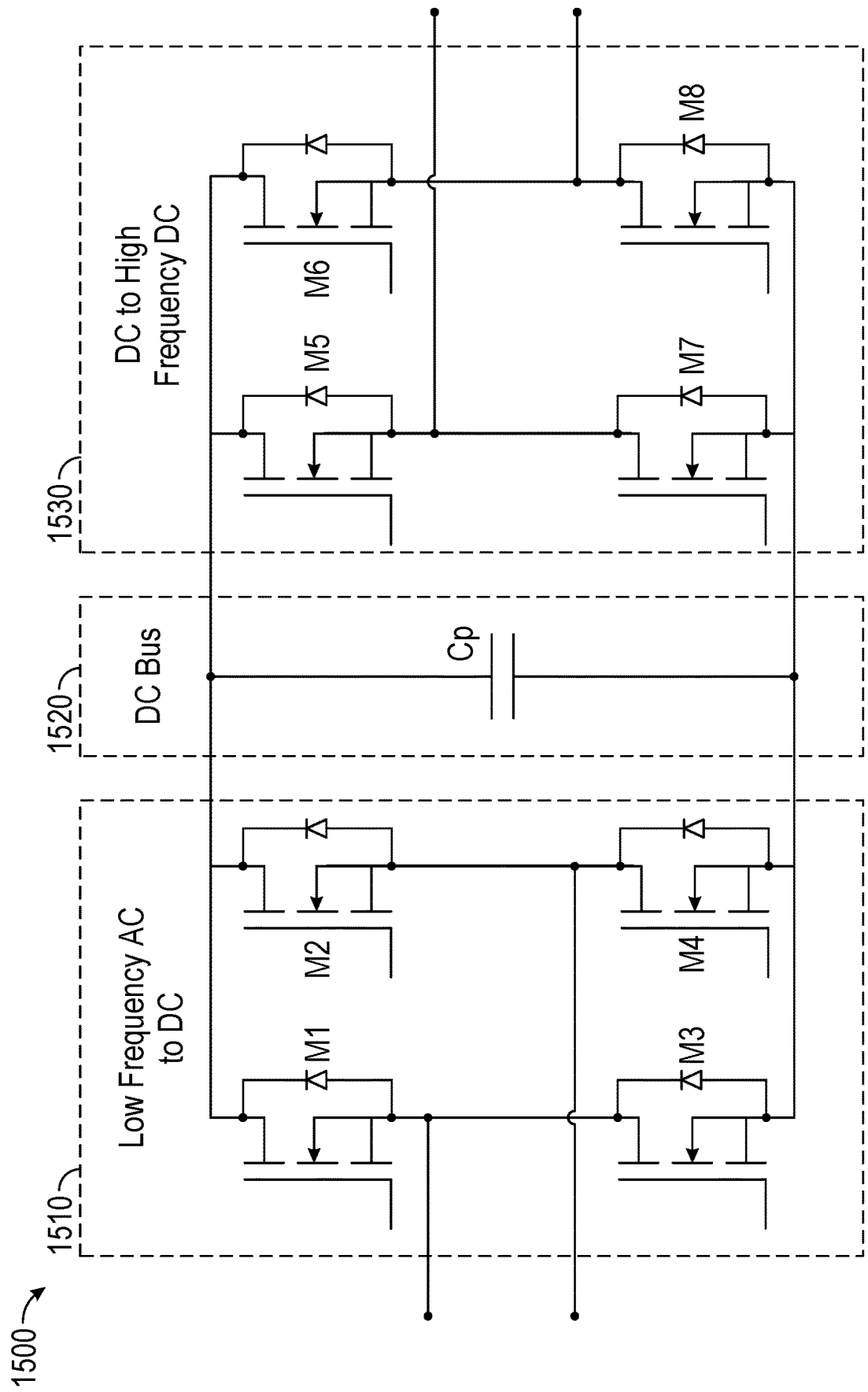
FIG. 15 is a schematic diagram of a power stage in accordance with an embodiment.

Referring now to FIG. 15, shown is a schematic diagram of a power stage that may couple between a distribution network and a high frequency transformer. In the illustration of FIG. 15, a power stage 1500 includes an AC-DC converter 1510, a DC bus 1520 and a DC-to-high frequency converter 1530. As illustrated, converters 1510 and 1530 may be implemented as H-bridge (full bridge) converters formed of a plurality of silicon carbide (SiC) MOSFETs (namely, MOSFETs M1-M4 in AC-DC converter 1510 and MOSFETs M5-M8 in high frequency converter 1530). As further shown, DC bus 1520 may be implemented with a capacitance Cp. Note that in other embodiments, Si MOSFETs, IGBTs or Gallium Nitride power transistors can be used instead of SiC MOSFETs, and also half bridge or other topologies can be used.

Figure 16:
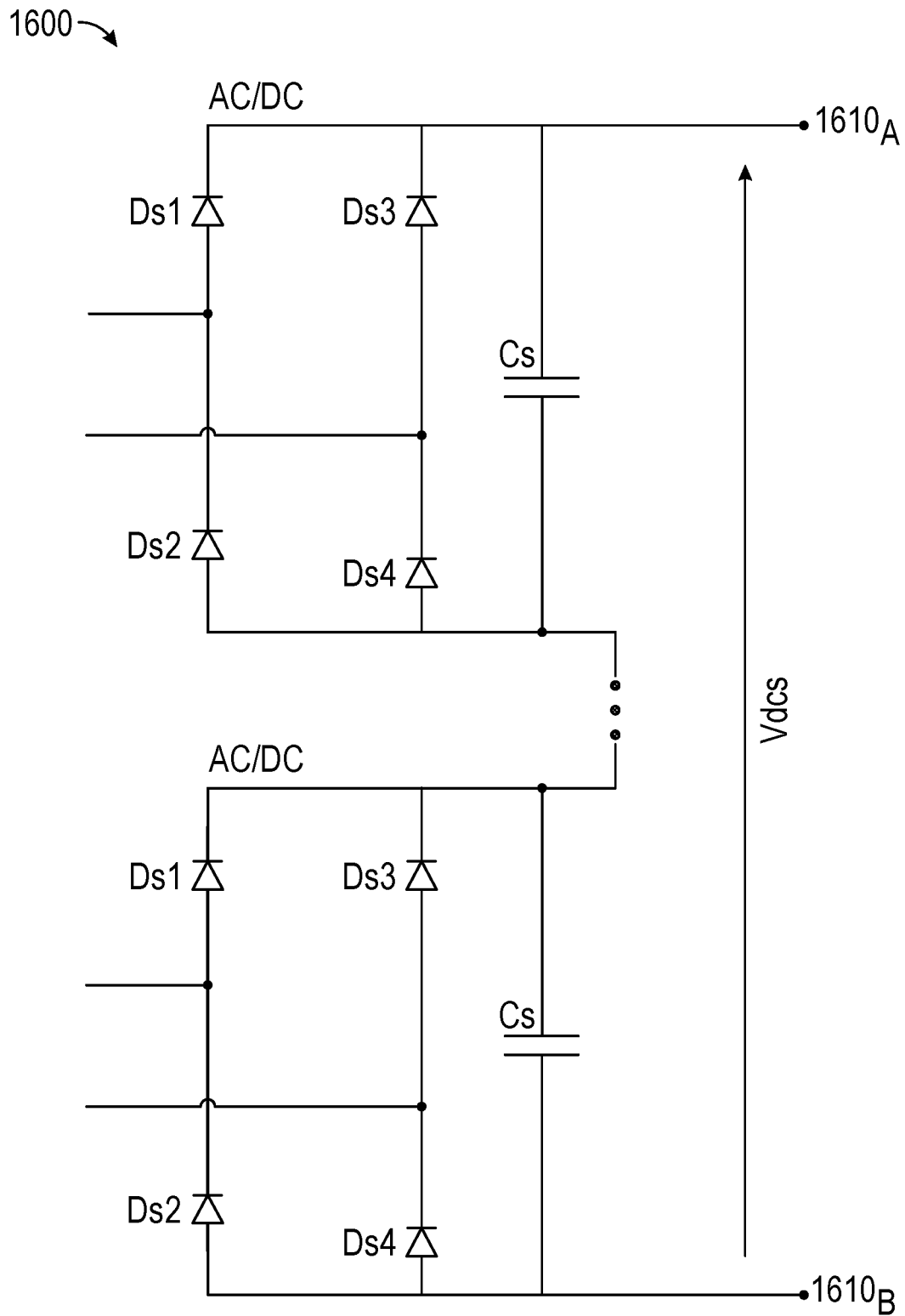
FIG. 16 is a schematic diagram of a port rectifier in accordance with an embodiment.

Referring now to FIG. 16, shown is a schematic diagram of a port rectifier in accordance with an embodiment. As shown in FIG. 16, port rectifier 1600 is implemented as a passive rectifier. As shown, multiple H-bridge rectifiers each formed of a plurality of diodes (Ds1-Ds4) may be cascaded together in series to provide a higher output voltage at output nodes $1610_{A,B}$. As further illustrated, corresponding capacitors Cs may be coupled in parallel to the H-bridge configurations (optionally in some cases). Understand while shown at this high level in the embodiment of FIG. 16, many variations and alternatives are possible.

Figure 17A:
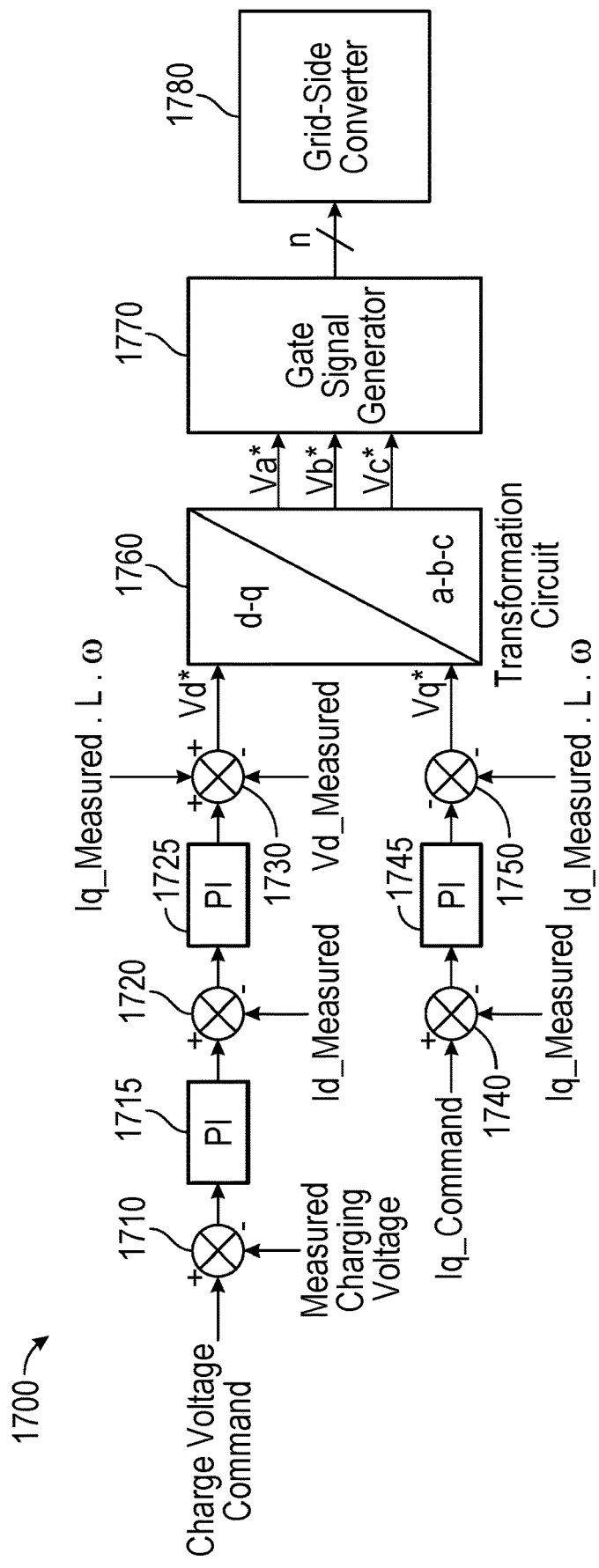
FIG. 17A is a block diagram of a controller in accordance with an embodiment.

Referring now to FIG. 17A, shown is a block diagram of a controller in accordance with an embodiment. As shown in FIG. 17, controller 1700 may be used to implement one or more control techniques as described herein. In this way, controller 1700 may be configured to control converter circuitry coupled to a primary side of a high frequency transformer to result in generation of a desired charging current and/or charging voltage to be supplied to dispensers to which one or more EVs may couple. In different implementations, controller 1700 may be implemented using general-purpose hardware such as one or more central processing units (CPUs), microcontrollers, programmable logic devices, field programmable gate arrays (FPGAs) or so forth. In certain implementations, such hardware circuitry alone or in combination with firmware and/or software of an EV charging system may be used to perform the control techniques.

As illustrated in FIG. 17A, shown is an example controlled voltage charging mode control technique. With this technique, a desired charging voltage may be provided as an input. In different implementations, this charging voltage may be received as a request from charging circuitry present in a connected EV, or may be provided in another manner. Where a fixed DC bus is supplied to multiple EV dispensers (such as in FIG. 13A), the charge voltage command is a fixed value (e.g., 1000V). In other cases, an EV charge system supplies a voltage requested by an EV battery, and thus the charge voltage command is assigned as the EV battery requested voltage. In one or more embodiments, feedback information in the form of one or more voltages and/or currents may be transformed from a three phase A-B-C reference frame to an arbitrary two-phase perpendicular rotary d-q reference frame.

As illustrated in FIG. 17A, this charge voltage command is provided to a first error circuit 1710, which also receives a measured charging voltage, which may be measured at output ports of the unidirectional rectifiers. The resulting difference corresponding to an error signal is provided to a proportional integral (PI) controller 1715. PI controller 1715 generates a control output that is provided to another error circuit 1720. As shown, error circuit 1720 also receives a measured current, namely, an active current that may be measured at an input of a grid-side converter as three-phase currents transformed to arbitrary two phase reference frame from the d-axis. The resulting output of error circuit 1720 is provided to another PI controller 1725 that, in turn, is coupled to another error circuit 1730. As shown error circuit 1730 receives the d-axis component of the grid-side voltage and may also receive a decoupling factor. A resulting d-axis component of voltage reference Vd* is provided to a transformation circuit 1760.

In similar manner, the q-axis component of voltage reference Vq* is generated and provided to transformation circuit 1760. Thus still referring to FIG. 17A, another path is present to accommodate decoupled control of active power and reactive power. As shown in this second path, a first error circuit 1740 receives a reactive current command and a q-axis component of the grid-side current, with an error signal being provided to a PI controller 1745 that provides an output to another error circuit 1750, which may also receive a decoupling factor. As shown, error circuit 1750 outputs a q-axis component of voltage reference Vq*, also provided to transformation circuit 1760.

In turn, transformation circuit 1760 may perform a d-q transformation to transform voltage and current values to the three phase A-B-C reference frame from the arbitrary two-phase perpendicular rotary d-q reference frame. As shown, transformation circuit 1760 outputs three-phase voltage control signals VA*-Vc* to a gate signal generator 1770 that, in turn, generates gate signals that may be provided to a grid-side converter 1780. Note that high frequency DC-to-AC converters may be controlled to synchronously switch at a fixed duty cycle. Understand while shown with this particular implementation in FIG. 17A, many variations and alternatives are possible. For example, in another mode, controller 1700 may instead receive a charge current command at error circuit 1710 to perform a controlled current charging mode.

Figure 17B:
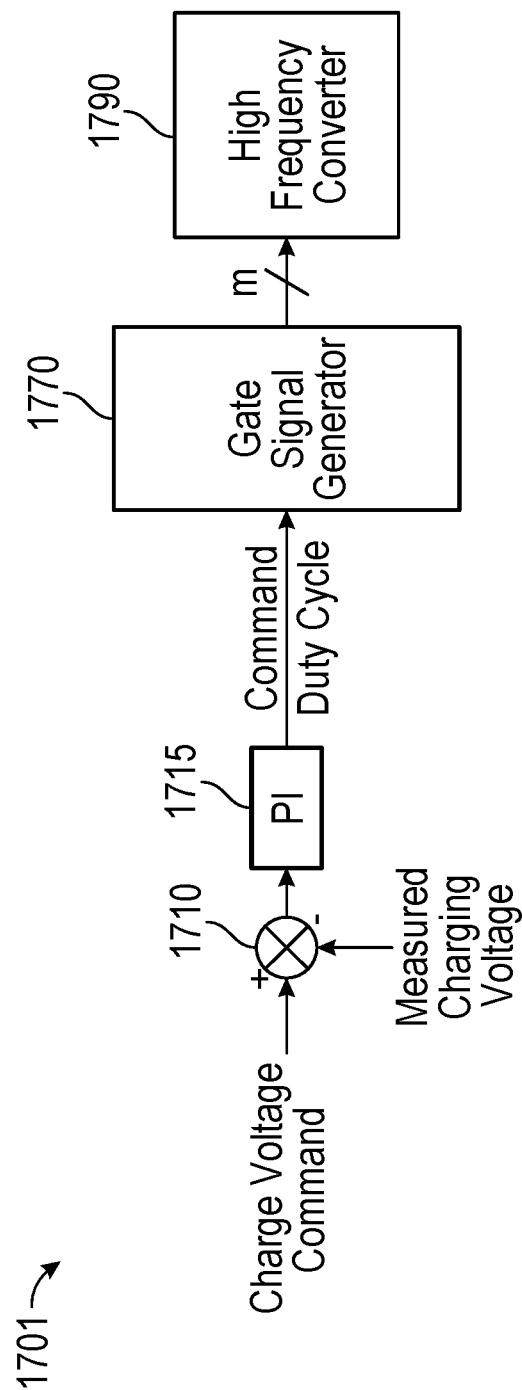
FIG. 17B is a block diagram of a controller in accordance with another embodiment.

In yet other implementations, control techniques may be performed to control charging voltage or current by appropriate control of high frequency converters. Referring now to FIG. 17B, shown is a controller in accordance with another embodiment. As shown in FIG. 17B, controller 1701 (which may be implemented using similarly circuitry as controller 1700) may be used to control a high frequency converter 1790. As illustrated, controller 1720 similarly includes a first error circuit 1710 and a PI controller 1715. Error circuit 1710 generates an error signal based on a received charge voltage command and a measured charging voltage. In turn, PI controller 1715 generates a command duty cycle that is provided to gate signal generator 1770, which generates gate signals to provide to high frequency converter 1790.

Although shown with this particular implementation, understand that this controller also may be configured for a controlled current charging mode in which error circuit 1710 instead receives a charge current control command and a measured charging current. In the embodiment of FIG. 17B, the DC bus voltages of the power stages may be assigned a fixed voltage (e.g., 800V). Then the port charging voltage (as in FIG. 13A) or supplied charge voltage to EV batteries (as in FIG. 13B) is regulated using the duty cycle of the high frequency converters.

Figure 18:
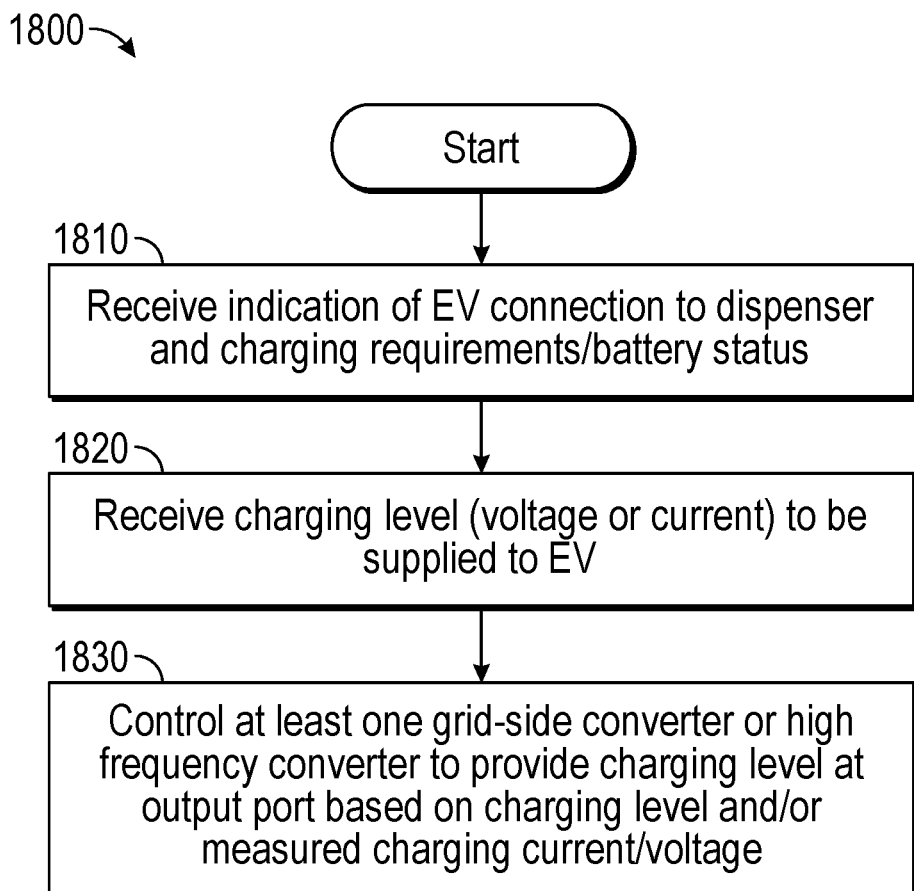
FIG. 18 is a flow diagram of a method in accordance with another embodiment.

Referring now to FIG. 18, shown is a flow diagram of a method in accordance with another embodiment. More specifically, method 1800 of FIG. 18 may be performed by a controller of an EV charging system to perform charging of one or more EVs connected to the EV charging system.

As illustrated, method 1800 begins by receiving an indication of connection of an EV to a dispenser and charging requirements/battery status of the EV (block 1810). This communication may be received in the controller from the EV itself, namely, a charging controller of the EV. In another configuration, the EV's may communicate to a central programmable logic controller (PLC) and the PLC can communicate to a charging station controller. Different communication protocols such as MODBUS, CAN BUS, Ethercat or so forth may be used.

Next at block 1820, the controller may receive a required charging level (e.g., a given charging voltage or charging current) to be supplied to the EV. Note that in some implementations, this information may be communicated as part of the communication of block 1810. Next at block 1830, at least one of a grid-side converter or a high frequency converter may be controlled. More specifically, the controller may send control signals to these converters to enable the EV charging system to provide the required charging level at an output port to which the EV is connected (such as via a dispenser). Note that the controller may execute one or more algorithms to determine the appropriate control based on the required charging level and/or a measured charging current/voltage.

Note that the determination as to control of grid-side converter or high frequency converter may be fixed by configuration of the EV charging system or the range of required charging voltage, such that the EV charging system may operate according to a single one of these modes or the control modes may be switched during charging, o both control modes can be used. Or it may be possible to selectively control one of the grid-side converters or high frequency converters based on charging requirements, the type of EV connected or one or more other conditions. In general by controlling the grid-side converter, a narrow range of charging voltages is possible (e.g., 700V to 1000V). If a lower voltage is needed, the duty cycle of the high frequency converter can be controlled to reduce the charging voltage. Understand while shown at this high level in the embodiment of FIG. 18, many variations and alternatives are possible.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
receiving, in a controller of an electric vehicle (EV) charging system, an indication of connection of at least one EV to a dispenser coupled to the EV charging system, wherein the EV charging system comprises:
a plurality of first converters directly coupled to receive grid power from a distribution network, the grid power at a medium voltage AC voltage;
a single high frequency transformer coupled to the plurality of first converters; and
a plurality of unidirectional rectifiers coupled to the single high frequency transformer;
determining a charging level to be supplied to the at least one EV; and
based at least in part on the charging level, controlling one or more of the plurality of first converters to supply the charging level to the at least one EV.

2. The method of claim 1, wherein controlling the one or more of the plurality of first converters comprises sending gate control signals to a front-end converter of the one or more of the plurality of first converters, to cause one or more of the plurality of unidirectional rectifiers to supply the charging level to the at least one EV, the front-end converter directly coupled to receive the grid power.

3. The method of claim 2, further comprising:
measuring a current at at least one of the plurality of first converters;
measuring a voltage at at least one of the plurality of first converters;
determining a control value based at least in part on the measured current and the measured voltage; and
generating the gate control signals based at least in part on the control value.

4. The method of claim 1, wherein controlling the one or more of the plurality of first converters comprises controlling a duty cycle of a high frequency converter of the one or more of the plurality of first converters, to cause one or more of the plurality of unidirectional rectifiers to supply the charging level to the at least one EV.

5. The method of claim 1, further comprising:
supplying the charging level to a first EV, until a temperature of a battery of the first EV reaches a threshold level; and
thereafter supplying the charging level to another EV.

6. The method of claim 5, further comprising controlling a switching network of a fleet charger comprising the dispenser to supply the charging level to the first EV and thereafter to supply the charging level to the another EV.

7. The method of claim 2, further comprising based at least in part on the charging level, controlling a high frequency converter of the one or more of the plurality of first converters to supply the charging level to the at least one EV.

8. The method of claim 7, further comprising switching between controlling the front-end converter of the one or more of the plurality of first converters and controlling the high frequency converter of the one or more of the plurality of first converters.

9. The method of claim 8, further comprising selectively controlling the high frequency converter based at least in part on a type of the at least one EV.

10. A method comprising:
receiving, in a controller of an electric vehicle (EV) charging system, an indication of connection of at least one EV to a dispenser coupled to the EV charging system, wherein the EV charging system comprises:
a plurality of first converters to receive grid power at a medium voltage AC voltage from a distribution network, each of the plurality of first converters comprising a front-end converter to receive and convert the medium voltage AC voltage to a DC voltage and a high frequency converter to convert the DC voltage to a high frequency voltage;
a single high frequency transformer coupled to the plurality of first converters; and
a plurality of unidirectional rectifiers coupled to the single high frequency transformer;
receiving a charge command for the at least one EV; and
charging the at least one EV based at least in part on the charge command comprising:
measuring a charging voltage or current provided to the at least one EV;
generating an error signal based on a comparison of the charge command and the charging voltage or current; and
controlling the high frequency converter of at least one of the plurality of first converters based at least in part on the error signal to supply a charging level to the at least one EV.

11. The method of claim 10, wherein controlling the high frequency converter of the at least one of the plurality of first converters comprises:
generating a duty cycle command based on the error signal; and
providing the duty cycle command to a gate signal generator.

12. The method of claim 11, wherein controlling the high frequency converter of the at least one of the plurality of first converters further comprises:
generating a plurality of gate signals in the gate signal generator based on the duty cycle command; and
sending the plurality of gate signals to the high frequency converter of the at least one of the plurality of first converters.

13. The method of claim 11, further comprising generating the duty cycle command in a proportional-integral controller based on the error signal.

14. The method of claim 10, further comprising receiving the charge command from a charging controller of the at least one EV.

15. The method of claim 10, further comprising controlling the front-end converter of at least one of the plurality of first converters to supply the charging level to the at least one EV.

16. A method comprising:
receiving, in a controller of an electric vehicle (EV) charging system, an indication of connection of at least one EV to a dispenser coupled to the EV charging system, wherein the EV charging system comprises:
a plurality of first converters to receive grid power at a medium voltage AC voltage from a distribution network, each of the plurality of first converters comprising a front-end converter to receive and convert the medium voltage AC voltage to a DC voltage and a high frequency converter to convert the DC voltage to a high frequency voltage;
a single high frequency transformer coupled to the plurality of first converters; and a plurality of unidirectional rectifiers coupled to the single high frequency transformer;

receiving a charge command for the at least one EV; and charging the at least one EV based at least in part on the charge command comprising:

measuring a charging voltage or current provided to the at least one EV;

generating an error signal based on a comparison of the charge command and the charging voltage or current; and controlling the front-end converter of at least one of the plurality of first converters based at least in part on the error signal to supply a charging level to the at least one EV.

17. The method of claim 16, wherein controlling the front-end converter of the at least one of the plurality of first converters comprises:

generating a second error signal based on a comparison of the error signal and a measured current at an input of the at least one of the plurality of first converters; and generating another error signal based on a comparison of the second error signal and a measured voltage at the input of the at least one of the plurality of first converters.

18. The method of claim 17, wherein controlling the front-end converter of the at least one of the plurality of first converters further comprises:

generating a plurality of voltage control signals based at least in part on the another error signal; and providing the plurality of voltage control signals to a gate signal generator.

19. The method of claim 18, further comprising:

generating a plurality of gate signals in the gate signal generator based on the plurality of voltage control signals; and sending the plurality of gate signals to the front-end converter of the at least one of the plurality of first converters.

20. The method of claim 16, further comprising controlling a high frequency converter of at least one of the plurality of first converters to synchronously switch at a fixed duty cycle.

\* \* \* \* \*